US009628822B2

(12) United States Patent
Leontaris et al.

(10) Patent No.: US 9,628,822 B2
(45) Date of Patent: Apr. 18, 2017

(54) LOW COMPLEXITY SAMPLE ADAPTIVE OFFSET ENCODING

(71) Applicant: QUALCOMM Incorporated, San Diego, CA (US)

(72) Inventors: Athanasios Leontaris, Cupertino, CA (US); Mang Li, San Diego, CA (US); Sumit Mohan, Milpitas, CA (US); In Suk Chong, San Diego, CA (US); Hariharan Ganesh Lalgudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 14/274,215

(22) Filed: May 9, 2014

(65) Prior Publication Data
US 2015/0215617 A1 Jul. 30, 2015

Related U.S. Application Data

(60) Provisional application No. 61/933,718, filed on Jan. 30, 2014.

(51) Int. Cl.
H04N 7/26 (2006.01)
H04N 19/117 (2014.01)
(Continued)

(52) U.S. Cl.
CPC ........... *H04N 19/82* (2014.11); *H04N 19/117* (2014.11); *H04N 19/147* (2014.11); *H04N 19/176* (2014.11); *H04N 19/182* (2014.11)

(58) Field of Classification Search
USPC ....................................................... 375/240
See application file for complete search history.

(56) References Cited

U.S. PATENT DOCUMENTS

2013/0114677 A1 5/2013 Baylon et al.
2013/0182759 A1 7/2013 Kim et al.
(Continued)

FOREIGN PATENT DOCUMENTS

EP 2725797 A1 4/2014
WO 2012176910 A1 12/2012
(Continued)

OTHER PUBLICATIONS

International Preliminary Report on Patentability from International Application No. PCT/US2015/012514, dated May 25, 2016, 17 pp.
(Continued)

Primary Examiner — Jeremaiah C Hallenbeck-Huber
Assistant Examiner — Susan E Hodges
(74) Attorney, Agent, or Firm — Shumaker & Sieffert, P.A.

(57) ABSTRACT

At least one processor is configured to encode samples of a largest coding unit (LCU) of a picture using a sample adaptive offset (SAO) mode. To encode the samples of the LCU using SAO, the at least one processor is configured to: calculate differences between corresponding reconstructed samples of the LCU and original samples of the LCU, clip a number of bits from each of the differences to form clipped differences, sum the clipped differences to form a sum of differences, clip the sum of differences to form a clipped sum of differences, calculate a number of the reconstructed samples, clip a number of bits from the number of reconstructed samples to form a dipped number of samples, and divide the clipped sum of differences by the clipped number of samples to produce an offset for the LCU.

10 Claims, 17 Drawing Sheets

(51) Int. Cl.
H04N 19/82 (2014.01)
H04N 19/176 (2014.01)
H04N 19/44 (2014.01)
H04N 19/86 (2014.01)
H04N 19/14 (2014.01)
H04N 19/147 (2014.01)
H04N 19/182 (2014.01)

(56) References Cited

U.S. PATENT DOCUMENTS

| | | | |
|---|---|---|---|
| 2013/0208788 A1* | 8/2013 | Chen | H04N 19/82 375/240.02 |
| 2013/0266058 A1 | 10/2013 | Minoo et al. | |
| 2013/0294501 A1 | 11/2013 | Sze et al. | |
| 2013/0336386 A1 | 12/2013 | Chong et al. | |
| 2014/0140416 A1* | 5/2014 | Yamazaki | H04N 19/70 375/240.25 |
| 2014/0294068 A1* | 10/2014 | Andersson | H04N 19/00127 375/240.02 |
| 2014/0301447 A1* | 10/2014 | Flynn | H04N 19/30 375/240.03 |

FOREIGN PATENT DOCUMENTS

| | | | |
|---|---|---|---|
| WO | 2013055923 A1 | 4/2013 | |
| WO | 2013068433 A2 | 5/2013 | |
| WO | 2013152356 A1 | 10/2013 | |

OTHER PUBLICATIONS

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Response to Second Written Opinion dated Mar. 18, 2016 from International Application No. PCT/US2015/012514, filed on May 9, 2016, 25 pp.
Second Written Opinion from International Application No. PCT/US2015/012514, dated Mar. 18, 2016, 13 pp.
Chong, et al., "AHG6/AHG5: Simplified SAO coding", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0347, Jul. 3, 2012, XP030112709, 5 pp.
Filippov, et al., "Non-SCE3.3: Inter-layer Interpolation-Based SAO Filtering for SHVC", JCT-VC Meeting; Jul. 25-Aug. 2, 2013, Vienna. (Joint Collaborative Team on Video Coding of ISO/IEC JTC1/SC29/WG11 and ITU-T SG.16), URL: http://wftp3.itu.int/av-arch/jctvc-site/, No. JCTVC-N0061-v4, Jul. 25, 2013, XP030114495, 6 pp.
International Search Report and Written Opinion from International Application No. PCT/US2015/012514, dated Jul. 9, 2015, 21 pp.
Jaehwan, et al., "Fast Sample Adaptive Offset Encoding Algorithm for HEVC based on Intra Prediction Mode", 2013 IEEE Third International Conference on Consumer Electronics Berlin (ICCE-Berlin), IEEE, Sep. 9, 2013, XP032549033, pp. 50-53.
McCann, et al., "High Efficiency Video Coding (HEVC) Test Model 13 (HM 13) Encoder Description", JCT-VC Meeting; Nov. 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O1002, Jan. 7, 2014, XP030115456, 36 pp.
Minoo, et al., "Non-CE1: Coding of SAO merge left and merge up", MPEG Meeting;Apr. 27-May 7, 2012; Geneva; (Motion Picture Expert Group or ISO/IEC JTC1/SC29/WG11), JCTVC-I0507, No. m25046, Jun. 7, 2012, XP030053389, 7 pp.
Partial International Search Report from International Application No. PCT/US2015/012514, dated May 4, 2015, 8 pp.
Praveen, et al., "Analysis and approximation of SAO estimation for CTU-level HEVC encoder", 2013 Visual Communications and Image Processing (VCIP), IEEE, Nov. 17, 2013, XP032543630, 5 pp.
Yamazaki, et al., "Improvement of Sample Adaptive Offset with modified bit accuracy and restricted offsets", MPEG Meeting; Jul. 14-22, 2011; Torino; Document: JCTVC-F396r2; (Motion Picture Expert Group or ISO/IEC JTC1/SC29/WG11), No. m20822, Jun. 7, 2012 , XP030049385, 6 pp.
Response to Written Opinion dated Jul. 9, 2015, from International Application No. PCT/US2015/012514, filed on Nov. 19, 2015, 5 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Fu et al., "Sample Adaptive Offset for HEVC," 2011 IEEE 13th International Workshop on Multimedia Signal Processing, Oct. 2011, 5 pp.
Fu et al., "Sample Adaptive Offset in the HEVC Standard," IEEE Transactions on Circuits and Systems for Video Technology, Dec. 2012, vol. 22, No. 12, 10 pp.
Fu et al., "CE13: Sample Adaptive Offset with LCU-Independent Decoding," Document: JCTVC-E049, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 6 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Mody, "Understanding in-loop filtering in the HEVC video standard," Jun. 21, 2013, 13 pp.

* cited by examiner

SAO_EO_0

SAO_EO_1

SAO_EO_2

SAO_EO_3

LOW COMPLEXITY SAMPLE ADAPTIVE OFFSET ENCODING

This application claims priority to Application No. 61/933,718, filed on 30 Jan. 2014, the entirety of which is incorporated herein by reference.

TECHNICAL FIELD

This disclosure relates to video coding and, more particularly, to techniques for sample adaptive offset (SAO) offset encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to sample adaptive offset (SAO) filtering. For example, this disclosure describes techniques for reducing the complexity of SAO mode decision making for a video encoder. Generally, this disclosure describes techniques for reducing computational complexity and memory requirements associated with encoding a block of video data, e.g., a largest coding unit (LCU) of a coded video picture, when using an SAO encoding mode. This disclosure also describes techniques related to determining an SAO encoding mode for an LCU, as well as techniques related to buffering samples of an LCU that are used when encoding the LCU using SAO. This disclosure describes techniques for estimating and comparing rate-distortion costs of cost functions associated with different SAO modes, and selecting the mode that optimizes the cost function. Additionally, this disclosure describes techniques for reducing the computational complexity of the cost functions.

In one example, a method for decoding video data includes encoding samples of a largest coding unit (LCU) of a picture using a sample adaptive offset (SAO) mode. Encoding the samples of the LCU using the SAO mode comprises: calculating differences between corresponding reconstructed samples of the LCU and original samples of the LCU, clipping a number of bits from each of the differences to form clipped differences, summing the clipped differences to form a sum of differences, clipping the sum of differences to form a clipped sum of differences, calculating a number of the reconstructed samples, clipping a number of bits from the number of reconstructed samples to form a clipped number of samples, and dividing the clipped sum of differences by the clipped number of samples to produce an offset for the LCU.

In another example, a device for encoding video data includes a memory, and at least one processor. The at least one processor is configured to: encode samples of a largest coding unit (LCU) of a picture using a sample adaptive offset (SAO) mode. To encode the samples of the LCU using the SAO mode, the at least one processor is configured to: calculate differences between corresponding reconstructed samples of the LCU and original samples of the LCU, clip a number of bits from each of the differences to form clipped differences, sum the clipped differences to form a sum of differences, clip the sum of differences to form a clipped sum of differences, calculate a number of the reconstructed samples, clip a number of bits from the number of reconstructed samples to form a clipped number of samples, and divide the clipped sum of differences by the clipped number of samples to produce an offset for the LCU.

In another example, a method for encoding video data includes determining at feast one sample adaptive offset (SAO) mode for an LCU, wherein the at least one SAO mode comprises at least one of: a band offset mode, an edge offset mode, a merge up mode, a merge left mode, and a skip mode. To determine the at least one SAO mode comprises determining the at least one SAO mode based on a predetermined priority of SAO modes for the LCU.

In another example, a device for encoding video data includes a memory and at least one processor. The at least one processor is configured to determine at least one sample adaptive offset (SAO) mode for an LCU, and the at least one SAO mode comprises at least one of: a band offset mode, an edge offset mode, a merge up mode, a merge left mode, and a skip mode. To determine the at least one SAO mode comprises determining the at least one SAO mode based on a predetermined priority of SAO modes for the LCU.

The details of one or more examples are set forth in the accompanying drawings and the description below. Other features, objects, and advantages will be apparent from the description and drawings, and from the claims.

DETAILED DESCRIPTION

Figure 1:
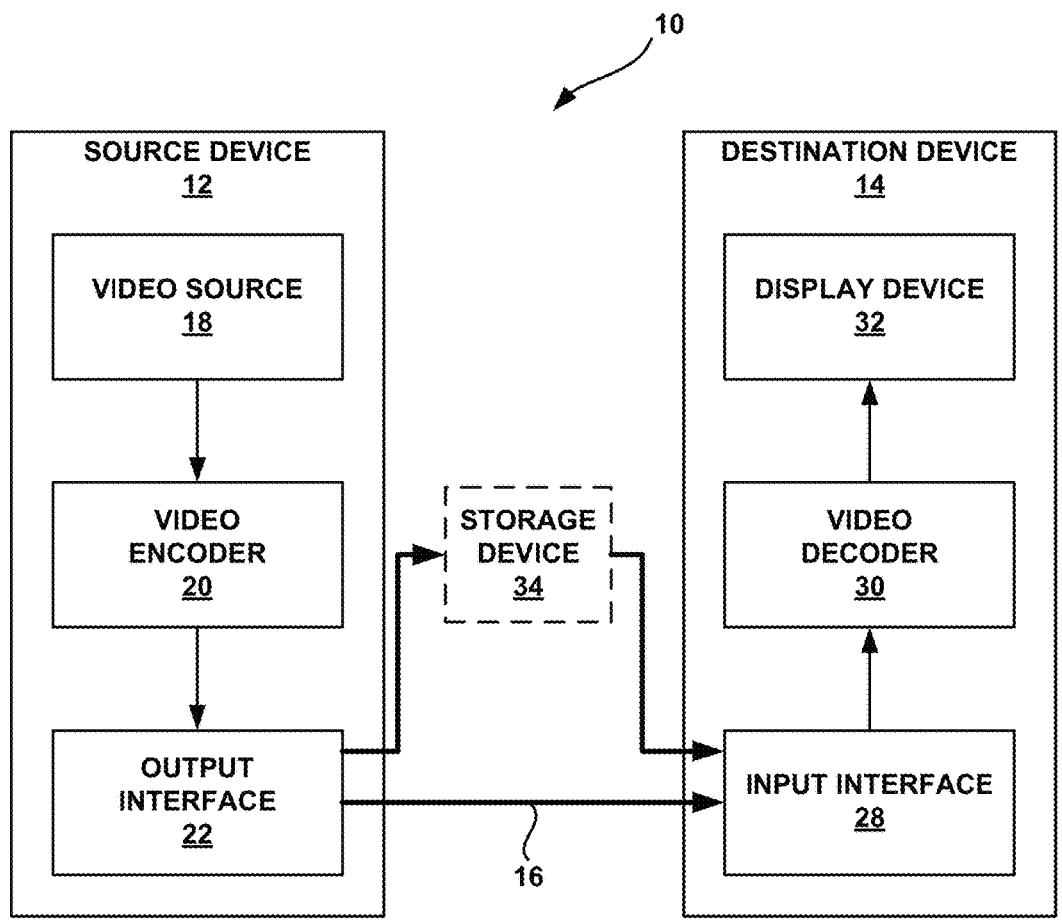
FIG. 1 is a block diagram illustrating an example video encoding and decoding system that may utilize the techniques described in this disclosure.

This disclosure describes techniques related to sample adaptive offset (SAO) filtering. For example, this disclosure describes techniques for reducing the computational complexity, and improving the bitrate coding efficiency when coding an LCU (largest coding unit) of a picture of video data using SAO mode. This disclosure also describes buffering techniques for encoding an LCU using SAO, as well as techniques for estimating the bitrate of an SAO mode, and selecting an SAO encoding mode to use when encoding an LCU.

SAO filtering is a type of loop filtering used in video coding. When encoding an LCU, a video coder (i.e. a video encoder or a video decoder) applies offset values to samples of the LCU. In general, the addition of offset values to samples in a coded picture of video data (e.g., a reconstructed image) may, in some instances, the image quality of the coded video picture without greatly increasing the bit overhead needed to store or transmit encoded video data. The improvement in coding that potentially results from SAO filtering may be, for example, that a decoded image more closely resembles an original image. SAO techniques allow a video coder to apply different offset values to different pixels (or blocks of pixels) depending on pixel (or block) classification metrics, such as edge metrics, band metrics, or other types of metrics.

In some examples, an SAO filter unit of a video coder may be configured to perform two types of SAO filtering, generally referred to in this disclosure as band offset (BO) filtering and edge offset (BO) filtering. An SAO filter unit of a video coder may also at times apply no offset, which, as explained in greater detail below, may itself be considered a third type of SAO filtering. A video coder may either explicitly or implicitly signal the type of offset filtering that an SAO filter unit applies. When applying edge offset filtering, a video coder can classify pixels based on edge information of a coding unit, and the video coder determines an offset for pixels (e.g., chroma and/or luma samples) of the coding unit based on the edge classification. As explained in greater detail below, there are typically four variations of edge-based SAO, where the value of a pixel is compared to two of its eight neighboring pixels. The two neighboring pixels that the video coder uses for comparison may depend on which variation of edge-based offset the video coder selects for the coding unit. Based on the magnitude of the difference between the pixels, a video coder may add an offset to pixels of the coding unit.

When applying band offset filtering, a video coder classifies pixels of a coding unit into different bands of a histogram. The video coder classifies the pixels based on a property of the pixel, such as an intensity value of the pixel, with each band having an associated offset. Each band may include a range of pixel values. For example, pixel values ranging from 0 to 255 may be divided into 32 equal bands (labeled 0 to 31), such that pixel values 0-7 are a first band, pixel values 8-15 are a second band, pixel values 16-23 are a third band, and so on for all thirty-two bands of the histogram. The video coder may use the bands to determine which particular offset value to apply to a pixel or group of pixels. For example, if a pixel has a value of 10 (which is within the second band, i.e. values 8-15, in the example above), then the video coder may add a particular offset associated with the second band to the pixel value.

In addition to classifying pixels into bands as described above, the video coder may group bands into two or more groups for the purpose of applying offset values. The video coder may further group the bands into two groups into two groups (e.g., two groups of sixteen bands, one group of four bands and one group of twenty-eight bands, one group of eight bands and one group of twenty-four bands, or other such groupings). The groupings of bands can be used for determining the order in which the offset values for the bands are signaled in an encoded video bitstream, and/or can be used to determine if a particular band has an offset value other than zero. The video coder may signal offsets for the bands using differential coding techniques in which a current value is signaled as a difference between the current offset value and a previous offset value.

This disclosure may generally refer to a video encoder "signaling" certain information to another device, such as a video decoder. It should be understood, however, that a video encoder may signal information by associating certain syntax elements with various encoded portions of video data. That is, the video encoder may "signal" data by storing certain syntax elements to headers of various encoded portions of video data. In some cases, such syntax elements may be encoded and stored (e.g., stored to a computer-readable medium) prior to being received and decoded by the video decoder. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

In any case, in some techniques included in the High Efficiency Video Coding (HEVC) standard, SAO filtering may be enabled and disabled at the slice level, and furthermore, SAO filtering may be enabled and disabled separately for luma and chroma samples. For example, for a particular slice of video data, both luma and chroma samples may be SAO filtered; neither luma nor chroma samples may be SAO filtered; or one of luma and chroma samples may be SAO filtered while the other is not. When SAO filtering is enabled for a slice, then SAO type and offset values are signaled at a largest coding unit (LCU) level.

As introduced above, the SAO type can include band offset filtering, edge offset filtering, or no SAO filtering. Thus, even if SAO filtering is enabled for a particular slice, some LCUs of that slice may not be SAO filtered (i.e. some LCUs will have an SAO type of no SAO filtering). In some instances, the SAO type and the offset values are signaled with a series of merge flag syntax elements, where a true value for a first merge flag indicates the offset type and the offset values for the LCU are inherited from a left-neighboring LCU and a true value for a second merge flag indicates the SAO type and the offset values are inherited from an above-neighboring (also referred to as a top-neighboring) LCU. If both merge flags are false, then the video coder signals syntax elements that indicate a new SAO type and new offset values for the LCU.

A video encoder (such as video encoder 20 described below) may be configured to reduce computational complexity and/or memory requirements associated with encoding video data with SAO filtering. In general, this disclosure may refer to "clipping" as a mathematical function that reduces the precision of a number to a specified maximum number of bits (i.e. a specified range of values). A clipping function may reduce the precision of a number by arithmetically right-shifting, arithmetically left-shifting, AND'ing, masking, rounding, using various hardware mechanisms, etc.

A video encoder (such as video encoder 20 described below) may also be configured to use the techniques of this disclosure when selecting an SAO mode from the modes described above. For example, in accordance with the techniques of this disclosure, video encoder 20 may be configured to determine at least one sample adaptive offset (SAO) mode for an LCU. The at least one SAO mode may comprise at least one of: a band offset mode, an edge offset mode, a merge up mode, a merge left mode, and a skip mode. To determine the at least one SAO mode, video encoder 20 may be configured to determine the at least one SAO mode based on a predetermined priority of SAO modes for the LCU.

FIG. 1 is a block diagram illustrating an example video encoding and decoding system 10 that may utilize the SAO encoding techniques described in this disclosure. As shown in FIG. 1, system 10 includes a source device 12 that generates encoded video data to be decoded at a later time by a destination device 14, and as will be described in more detail below, this encoding and decoding of video data may include coding SAO modes and/or offset values. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently-standardized High Efficiency Video Coding (HEVC) standard, and may conform to the HEVC Test Model (HM). Document ITU-T H.265, SERIES H: AUDIO-VISUAL AND MULTIMEDIA SYSTEMS, Infrastructure of Audiovisual Services—Coding of Moving Video, "High Efficiency Video Coding," April 2013, referred to as the "HEVC Standard."

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (ROT) The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU, The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures, A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2 N×2 N, the HM supports intra-prediction in PU sizes of 2 N×2 N or N×N, and inter-prediction in symmetric PU sizes of 2 N×2 N, 2 N×N, N×2 N, or N×N. The HM also supports asymmetric partitioning for inter-prediction in PU sizes of 2 N×nU, 2 N×nD, nL×2 N, and nR×2 N. In asymmetric partitioning, one direction of a CU is not partitioned, while the other direction is partitioned into 25% and 75%. The portion of the CU corresponding to the 2.5% partition is indicated by an "n" followed by an indication of "Up", "Down," "Left," or "Right." Thus, for example, "2 N×nU" refers to a 2 N×2 N CU that is partitioned horizontally with a 2 N×0.5 N PU on top and a 2 N×1.5 N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16), Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

SAO coding is also included in the HEVC standard. In general, the addition of offset values to pixels in a video picture may improve reconstructed video quality without greatly increasing the coding bit overhead needed to store or transmit encoded video data. SAO techniques allow for a video coder, such as video encoder 20 and/or video decoder 30, to apply different offset values to be applied to different pixels (or blocks) depending on pixel (or block) classification metrics. Possible classification metrics include band metrics and activity metrics such as edge metrics. A description of offset classifications can be found in C.-M. Fu, C.-Y. Chen, C.-Y. Tsai, Y.-W. Huang, S. Lei, "CE13: Sample Adaptive Offset with LCU-Independent Decoding," JCT-VC Contribution, E049, Geneva, February 2011 ("C.-M. Fu et al").

In the SAO implementation according to the HEVC standard, each partition (which may consist of a number of blocks, such as a set of LCUs) may have one of five SAO modes, which are also referred to as pixel classifications. A video encoder, e.g. video encoder 20, may selectively enable SAO processing on an LCU basis (an LCU may take sizes of 16×16, 32×32, or 64×64). If SAO processing is enabled then video encoder 20 may process the LCU components (Y, Cb, Cr) with one of five SAO options. Video encoder 20 signals the values of the syntax values "sao_type_idx_luma" and "sao_type_idx_chroma" to indicate to video decoder 30 which mode to apply to the luma and chroma channels of the selected LCU, respectively.

The first mode is "edge offset," (EO). If video encoder 20 selects this mode, video encoder 20 signals sao_type_idx_luma/chroma=2. Additionally, video encoder 20 signals one of four possible edge classifiers (see Table 1 shown below) as being selected based on the sao_eo_class_luma and sao_eo_class_chroma syntax values, which are discussed in greater detail below. When the EO mode is selected, video encoder 20 classifies pixels in the LCU into one of five possible categories. Four of those categories have non-zero offsets, which may be explicitly signaled in the bitstream. Video encoder 20 then adds these offsets to pixels that belong to the respective category.

The second mode is "band offset" (BO), which video encoder 20 signals by setting sao_type_idx_luma/chroma=1. In this mode, video encoder 20 classifies pixels in the LCU into 32 possible categories (bands). In accordance with the techniques of this disclosure, video encoder 20 may classify the pixels into the 32 bands by right-shifting the intensity of each of the pixels by 3 bits (for pixels having 8 bit intensity values). Only a group of four consecutive bands out of those 32 will have non-zero offsets, which video encoder 20 explicitly signals in the bitstream. Video encoder 20 signals the position of the first of the non-zero offsets signaled as the syntax element sao_band_position. Video encoder 20 then adds each offset to pixels that belong to the associated band.

In the next mode, also referred to as "skip mode," video encoder 20 does not apply processing and video encoder 20 signals sao_type_idx_luma/chroma equal to zero. In this mode, video encoder 20 leaves the pixels of the current LCU are left, unchanged, and SAO acts as pass-through for pixels output from a deblocking block/unit on the way to the decoded picture buffer (DPB) (also referred to as a "reference picture memory" or simply "memory" as described below with respect to FIG. 4).

In a fourth mode, referred to as "merge left" mode, video encoder 20 applies the SAO parameters of the left-neighboring LCU to the pixels of the current LCU (where the left-neighboring LCU is the LCU that is positioned directly to the left of the LCU currently being coded). Video encoder 20 set the value of sao_merge_left_flag equal to one when video encoder 20 selects this mode. In a fifth mode, referred to as "merge up" mode, video encoder 20 applies the SAO parameters of the top-neighboring LCU to pixels of the current LCU (where the top-neighboring LCU is the LCU that is positioned directly above the LCU currently being coded). In this mode, video encoder 20 sets the values of sao_merge_left_flag equal to 0, and sao_merge_up_flag equal to 1.

FIGS. 2A-2D are conceptual diagrams showing the four possible edge offset classifications currently included in the HEVC standard. The edge offset type classifies each pixel based on edge information, and each pixel of the current LCU is classified using a filter shape, which is indexed by the syntax element sao_eo_class. The four possible filter shapes include: horizontal (class 0), vertical (class 1), 135-degree (class 2) and 45-degree (class 3), which are shown in FIGS. 2A-2D, respectively.

Video encoder 20 repeats the classification operation for each pixel, recPicture[xC+i, yC+j]. In the LCU component (xC,yC) are coordinates of the top left sample of the LCU, and i=0 . . . 31 and j=0 . . . 31 for luma, and i=0 . . . 15 and j=0 . . . 15 for chroma, for an exemplary 32×32 LCU. Video encoder 20 uses two neighboring pixels, recPicture[xC+i+hPos[k], yC+j+vPos[k]], where k=0 . . . 1, along with the current sample recPicture[xC+i, yC+j]. The coordinates of the neighboring pixels, denoted as hPos and vPos, are defined in Table 1 below.

TABLE 1

Coordinates of filter taps for different sao_eo_class values

| SaoEoClass[cIdx][rx][ry] | 0 | 1 | 2 | 3 |
|---|---|---|---|---|
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

The classification operation is shown in the first two lines of Table 2. This operation, which video encoder 20 performs, classifies the current pixel into one of five possible categories that are shown in Table 3 below. During classification, video encoder 20 assigns each pixel of the current LCU an index that ranges from 0 to 4. Video encoder 20 sends any non-zero offsets in the bitstream for the four categories indexed with 1 through 4. Given the category index (edgeTable[edgeIdx]) for the current pixel, video encoder 20 applies the appropriate offset to the pixel as shown in the third line of Table 2. The parameter saoValueArray has 5 entries, ail of which are initialized with the zero value. Entries 1 through 4 are populated with the offset values signaled in the bitstream.

TABLE 2

EO Classification and application of offset to reconstructed sample $$\text{Sign}(x) = \begin{cases} 1; & x > 0 \\ 0; & x = 0 \\ -1; & x < 0 \end{cases}$$

TABLE 2-continued

EO Classification and application of offset to reconstructed sample edgeIdx = 2 + $\Sigma_k$( Sign( recPicture[ $xS_i$ ][ $yS_j$ ] –
  recPicture[ $xS_i$ + hPos[ k ] ][ $yS_j$ + vPos[ k ] ] ) ) with k = 0 . . . 1
When edgeIdx is equal to 0, 1, or 2, it is modified as follows.
edgeIdx = ( edgeIdx = = 2 ) ? 0 : ( edgeIdx + 1 )
saoPicture[ $xS_i$ ][ $yS_j$ ] = Clip3( 0, ( 1 << bitDepth ) − 1,
  recPicture[ $xS_i$ ][ $yS_j$ ] + SaoOffsetVal[ cIdx ][ rx ][ ry ]
  [ edgeIdx ] )

Figure 2A:
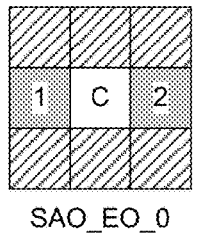
FIGS. 2A-D are conceptual diagrams illustrating example edge offset classifications for sample adaptive offset (SAO) coding.
Figure 2B:
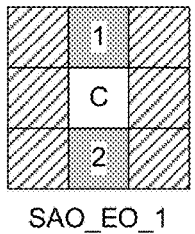
Figure 2C:
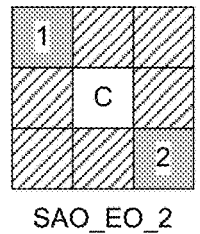
Figure 2D:
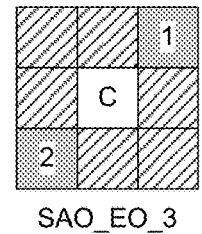

For each of the edge classifications shown in FIGS. 2A-2D, video encoder 20 calculates an edge type for the current pixel by comparing the value of the current pixel (C) to the values of neighboring pixels (1 and 2). FIG. 2A illustrates a horizontal edge offset of classification zero (sao_eo_class=0). In FIG. 2A, video encoder 20 compares the current pixel (pixel C) to the left neighbor pixel (pixel 1) and the right neighbor pixel (pixel 2). FIG. 2B illustrates a vertical SAO edge offset of classification (sao_eo_class=1). In the classification of FIG. 2B, video encoder 20 compares the current pixel (pixel C) to the top neighbor pixel (pixel 1) and the bottom neighbor pixel (pixel 2). For the 135-degree SAO edge offset classification (sao_eo_class=2) shown in FIG. 2C, video encoder 20 compares the current pixel (pixel C) to the upper left neighbor pixel (pixel 1) and the bottom right neighbor pixel (pixel 2). For the 45-degree SAO edge offset classification (sao_eo_class=3) shown in FIG. 2D, video encoder 20 compares the current pixel (pixel C) to the upper right neighbor pixel (pixel 1) and the bottom left neighbor pixel (pixel 2).

The four edge offset classifications may each have an edge type with five possible integer values ranging from 0 to 4. Initially, the edge type of the current pixel is assumed to be zero. If the value of current pixel C is equal to the values of both the left and right neighbor pixels (1 and 2), the edge type of C is equal to zero. If the value of C is less than the values of both neighboring pixels, the edge type of C is equal to one. If the value of the current pixel C is less than one of the neighboring pixels, and C is equal to the value of the other pixel, the edge type is equal to two. If the value of the current pixel C is greater than the value of one neighboring pixel and C is equal to the value of the other neighboring pixel the edge type is equal to three. If the value of the current pixel C is greater than the value of both neighboring pixel values, the edge type is equal to four. Table 3 summarizes the FX) classification categories based on the comparison of the current pixel (p) with the neighboring pixels.

TABLE 3

Classification categories after applying the EO classifiers

| Category | Condition |
| --- | --- |
| 1 | p smaller than both of neighbours |
| 2 | p smaller than one of neighbours && p equal to one of neighbours |
| 3 | p greater than one of neighbours && p equal to one of neighbours |
| 4 | p greater than both of neighbours |
| 0 | None of the above |

Video encoder 20 classifies samples in the same channel (i.e. Y, Cr, or Cb channel) into one of the five categories described above, and determines an offset to apply to each of the pixels in each of the categories. Video encoder 20 selects one of the five EO modes to use for the current LCU based on a rate-distortion cost function and signals the category, as well as the offset value for the selected EO category in a coded video bitstream.

To determine the offset that is applied to a CU for each edge class, video encoder 20 determines a sum of differences between original samples of the CU classified with a particular edge class and reconstructed samples of the block having the same edge class. In accordance with the techniques of this disclosure, in order to reduce memory requirements, video encoder 20 may clip (e.g., reduce) the bitwidth of the differences to the range of [−32, 31], such that 6 bits are a sufficient number of bits to reduce each difference between the original samples and the reconstructed samples. After adding each 6-bit-clipped difference value to the sum of differences, video encoder 20 further clips the sum of differences to the range of [−4095, 4095] in order to reduce the number of bits needed to represent the sum of differences to 13 bits.

As part of determining the offset value for the pixels belonging to an edge class, video encoder 20 calculates the number of reconstructed samples belonging to that edge class, and clips the value of the number of samples to the range [0, 1023], such that 10 bits represent the number of pixels belonging to the edge class.

Next, video encoder 20 divides the clipped sum of differences by the number of samples to determine the offset value for the edge class. In order to improve the performance of the division, however, video encoder 20 may perform division by iterative subtraction. As part of the iterative subtraction, video encoder 20 may set a temporary variable equal to the absolute value of the clipped sum of differences. Video encoder 20 may then iteratively subtract the number of samples from the variable equal to the absolute value of the clipped sum of differences until the resulting difference is less than or equal to zero. The offset for the LCU is then equal to the number of iterative subtractions performed.

Thus, in accordance with the techniques of this disclosure, video encoder 20 may be configured encode samples of a largest coding unit (LCU) of a picture using a sample adaptive offset (SAO) mode. To encode the samples of the LCU using the SAO mode, the at least one processor is configured to: calculate differences between corresponding reconstructed samples of the LCU and original samples of the LCU, clip a number of bits from each of the differences to form clipped differences, sum the clipped differences to form a sum of differences, clip the sum of differences to form a clipped sum of differences. Video encoder 20 may be further configured to calculate a number of the reconstructed samples, clip a number of bits from the number of reconstructed samples to form a clipped number of samples, and divide the clipped sum of differences by the clipped number of samples to produce an offset for the LCU.

When decoding an EO-filtered LCU, video decoder 30 determines the offset and the EO category based on values received in the coded video bitstream. Video decoder 30 applies the offset to the samples of the LCU that are classified as belonging to the signaled EO category.

This disclosure describes techniques for reducing the computational complexity of determining the offset for each of the EO categories, as described in greater detail below.

Figure 3:
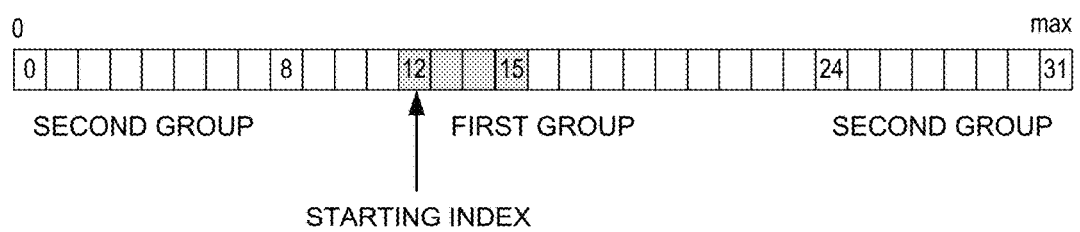
FIG. 3 is a conceptual diagram illustrating example band offset classifications for SAO coding.

FIG. 3 is a conceptual diagram showing example bands that may be used in band offset (BO) SAO filtering. Each rectangle in FIG. 3 represents a band. The example of FIG. 3 shows 32 bands, i.e. bands 0-31, and some of the bands, such as band 0, band 8, band 12, band 15, band 24, and band 31 have been labeled. For band-based offset, pixels are classified into different bands based on pixel values, such as intensity values. For purposes of example, assume pixel values range from 0-255 (e.g., for samples having 8-bit bitdepth), although other ranges such as 0-1023 (e.g., when pixels have 10-bit bitdepth) may also be used. In such an example the max value shown in FIG. 3 would be equal to 2.55, and each of the thirty-two bands shown in FIG. 3 would have a range of 8. The left-most band (i.e. band 0 in FIG. 3) may contain pixels having intensity values 0-7, the next band (i.e. band 1 in FIG. 3) may contain pixels having intensity values of 8-15, the next band (i.e. band 2) may contain pixels having intensity values 16-23, and so on, until reaching the right most band (i.e. band 31 in FIG. 3), which may contain pixels having intensity values 248-255.

When encoding, an encoder, e.g. video encoder 20, determines a four band range, and corresponding offsets to add or subtract from each of the pixels that fall in the selected four-band range. Video encoder 20 may determine the number of pixels in each band by arithmetically right-shifting the intensity of each pixel in the currently process channel by three bits (>>3) in some examples. Video encoder 20 signals only the index of the leftmost band, and video decoder 30 determines that the next three right-neighboring bands should also have offsets applied, based on the signaled leftmost band. In this way, the signaling associated with indicating a band or number of bands may be reduced (versus signaling each of the bands).

In the example of FIG. 3, the four-band range that video encoder 20 has determined begins at band 12, and ends at band 15. Video encoder 20 signals the index (shown in FIG. 13 as starting index 12) of the leftmost band to be filtered, and video decoder 30 determines that the samples in bands 12-15 will have offsets applied based on the signaled index. Video encoder 20 also determines and signals offsets for each of the four bands, and video decoder 30 applies to the offsets to the samples in bands 12-15.

To determine the offsets associated with each of the four bands, video encoder 20 may utilize a process similar to the process described above with respect to FIGS. 2A-2D. That is, video encoder 20 may determine difference values between original and reconstructed pixel values, clip the difference values and add the clipped difference values to produce a sum of differences, which video encoder 20 may also clip to produce a clipped sum of differences. Video encoder 20 may also calculate a number of pixels belonging to each band and clip the number of differences to produces a clipped number of pixels. To determine the offset value, video encoder 20 may divide the sum of differences by the number of pixels, as described above using iterative subtraction.

Additional techniques for reducing the complexity of performing band offset filtering are described below in greater detail.

Figure 4:
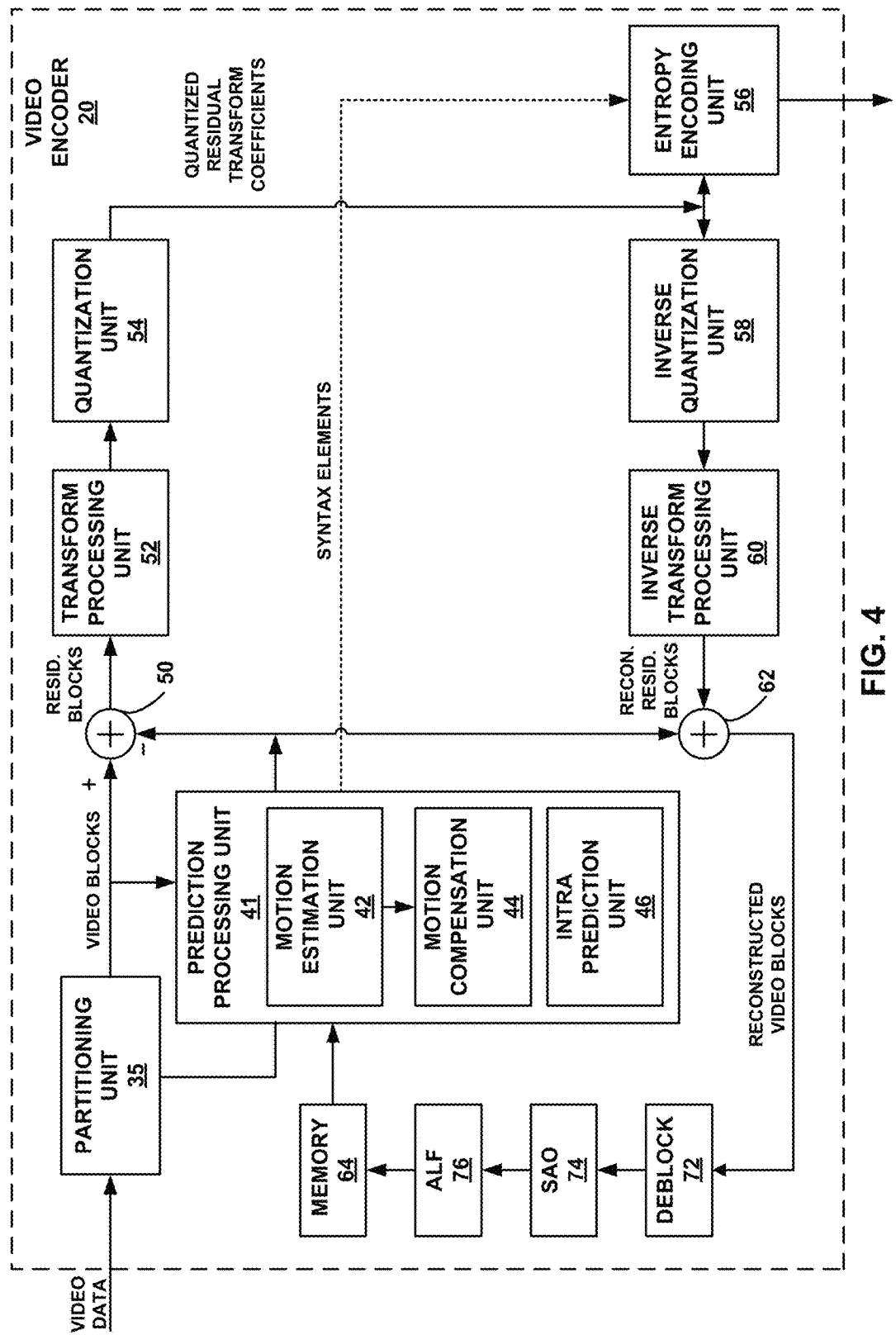
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Infra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partitioning unit 35, prediction processing unit 41, summer 50, transform processing unit 52, quantization unit 54, entropy encoding unit 56, and memory 64. Prediction processing unit 41 includes motion estimation unit 42, motion compensation unit 44, and intra prediction unit 46. For video block reconstruction, video encoder 20 also includes inverse quantization unit 58, inverse transform processing unit 60, summer 62, deblocking filter unit 72, SAO unit 74, and adaptive loop filter (ALF) 76. Although deblocking filter unit 72, SAO unit 74, and ALF 76 are shown in FIG. 4 as being in-loop filters, in other configurations, deblocking filter unit 72, SAO unit 74, and ALF 76 may be implemented as post-loop filters. Moreover, while shown and described separately for purposes of explanation, the filtering units may be highly integrated.

As shown in FIG. 4, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block-relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (OCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in memory 64. The reference block may be used by motion estimation unit 42 and motion compensation unit 44 as a reference block to inter-predict a block in a subsequent video frame or picture.

Prior to storage in memory 64, video encoder 20 may filter the reconstructed residual block using one or more filters. For example, deblocking filter 72 may be applied to filter the reconstructed residual blocks in order to remove blockiness artifacts. Other loop filters, such as ALF 76 and SAO 74 (either in the coding loop or after the coding loop) may also be used to smooth pixel transitions, or otherwise improve the video quality. The reference block, after being filtered by one or more of deblocking filter unit 72, SAO unit 74, and ALF unit 76, may be used by motion estimation unit 42 and motion compensation unit 44 as a reference block to inter-predict a block in a subsequent video frame or picture.

SAO unit 74 may determine offset values for SAO filtering in a manner that improves video coding quality. Improving video coding quality may, for example, involve determining offset values that make a reconstructed image more closely match an original image. Video encoder 20 may, for example, code the video data using multiple passes with different SAO types and different offset values and choose, for inclusion in an encoded bitstream, the SAO type and offset values that offer the best coding quality, as determined based on a desired rate-distortion tradeoff.

In some configurations, SAO unit 74 may be configured to apply two types of offset (e.g., band offset and edge offset), as described above. SAO unit 74 may also at times apply no offset, which may be considered a third type of offset. The type of offset applied by SAO unit 74 may be either explicitly or implicitly signaled to a video decoder. When applying edge offset, pixels may be classified based on edge information in accordance with FIGS. 2A-2D and an offset value can be determined based on the edge classification. When applying band-based offset, SAO unit 74 may classify pixels into different bands based on a pixel value, such as an intensity value, with each band having an associated offset as described with respect to FIG. 3.

According to one aspect of this disclosure, SAO unit 74 may be configured to encode samples of a largest coding unit (LCU) of a picture using a sample adaptive offset (SAO) mode. To encode the samples of the LCU using the SAO mode, SAO unit 74 may be configured to calculate differences between corresponding reconstructed samples of the LCU and original samples of the LCU, clip a number of bits from each of the differences to form clipped differences, sum the clipped differences to form a sum of differences, clip the sum of differences to form a clipped sum of differences, calculate a number of the reconstructed samples, clip a number of bits from the number of reconstructed samples to form a clipped number of samples, and divide the clipped sum of differences by the clipped number of samples to produce an offset for the LCU.

According to another aspect of this disclosure, SAO unit 74 may be configured to determining at least one sample adaptive offset (SAO) mode for an LCU. The at least one SAO mode may comprise at least one of: a band offset mode, an edge offset mode, a merge up mode, a merge left mode, and a skip mode. To determine the at least one SAO mode, SAO unit 74 may be configured to determine the at least one SAO mode based on a predetermined priority of SAO modes for the LCU.

Figure 5:
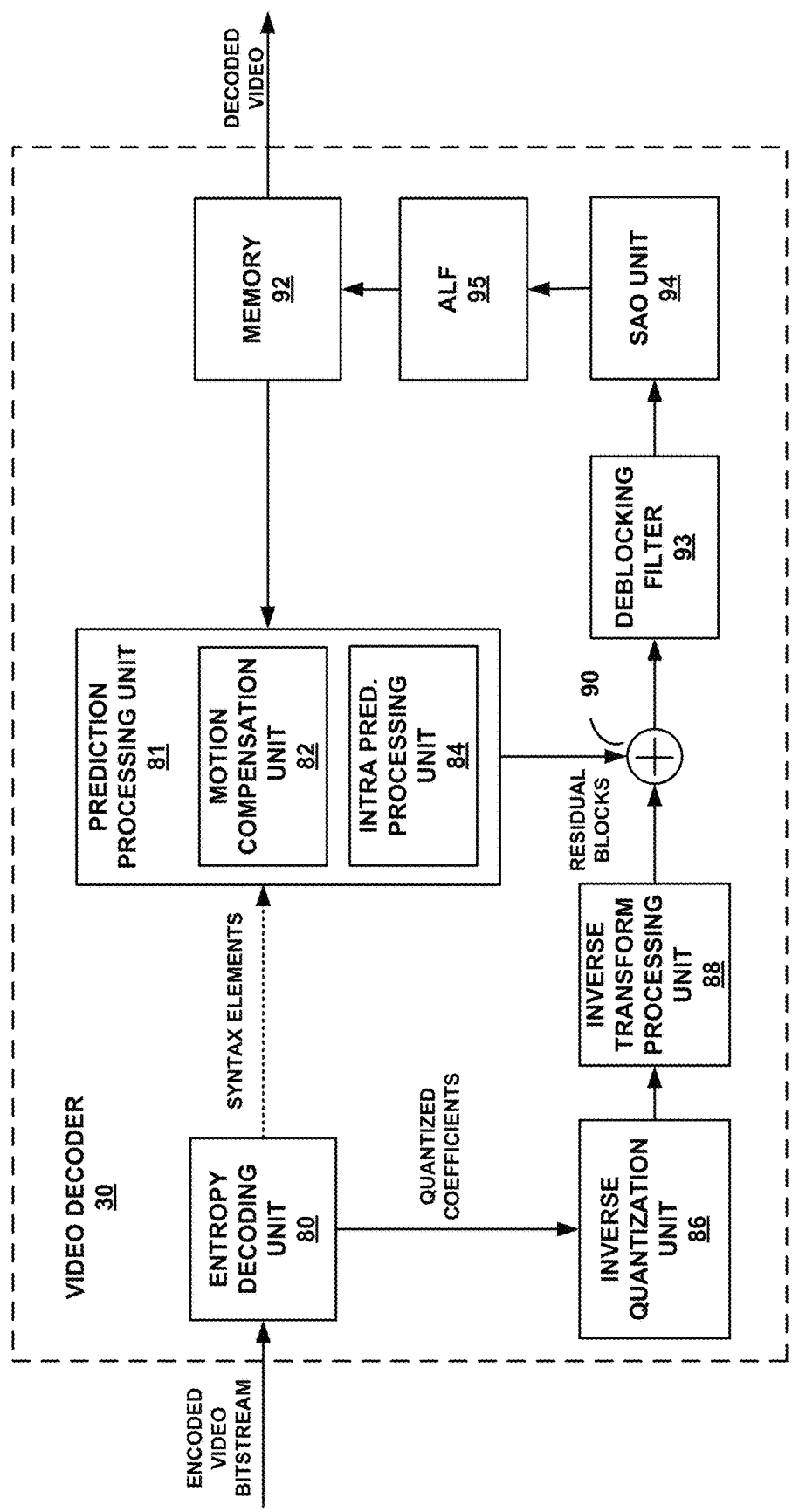
FIG. 5 is a block diagram illustrating an example video decoder.

FIG. 5 is a block diagram illustrating an example video decoder 30. In the example of FIG. 5, video decoder 30 includes an entropy decoding unit 80, prediction processing unit 81, inverse quantization unit 86, inverse transform processing unit 88, summer 90, deblocking filter unit 93, SAO unit 94, ALF unit 95, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter unit 93, SAO unit 94, and ALF unit 95. The decoded video blocks in a given frame or picture are then stored in memory 92 (which may be referred to as a reference picture memory or decoded picture buffer), which stores reference pictures used for subsequent motion compensation. Memory 92 also stores decoded video for later presentation on a display device, such as display device 32 of FIG. 1. According to aspects of this disclosure, SAO unit 94 may be configured to apply the same filtering (e.g., edge offset and band offset) as SAO unit 74 discussed above.

Figure 6:
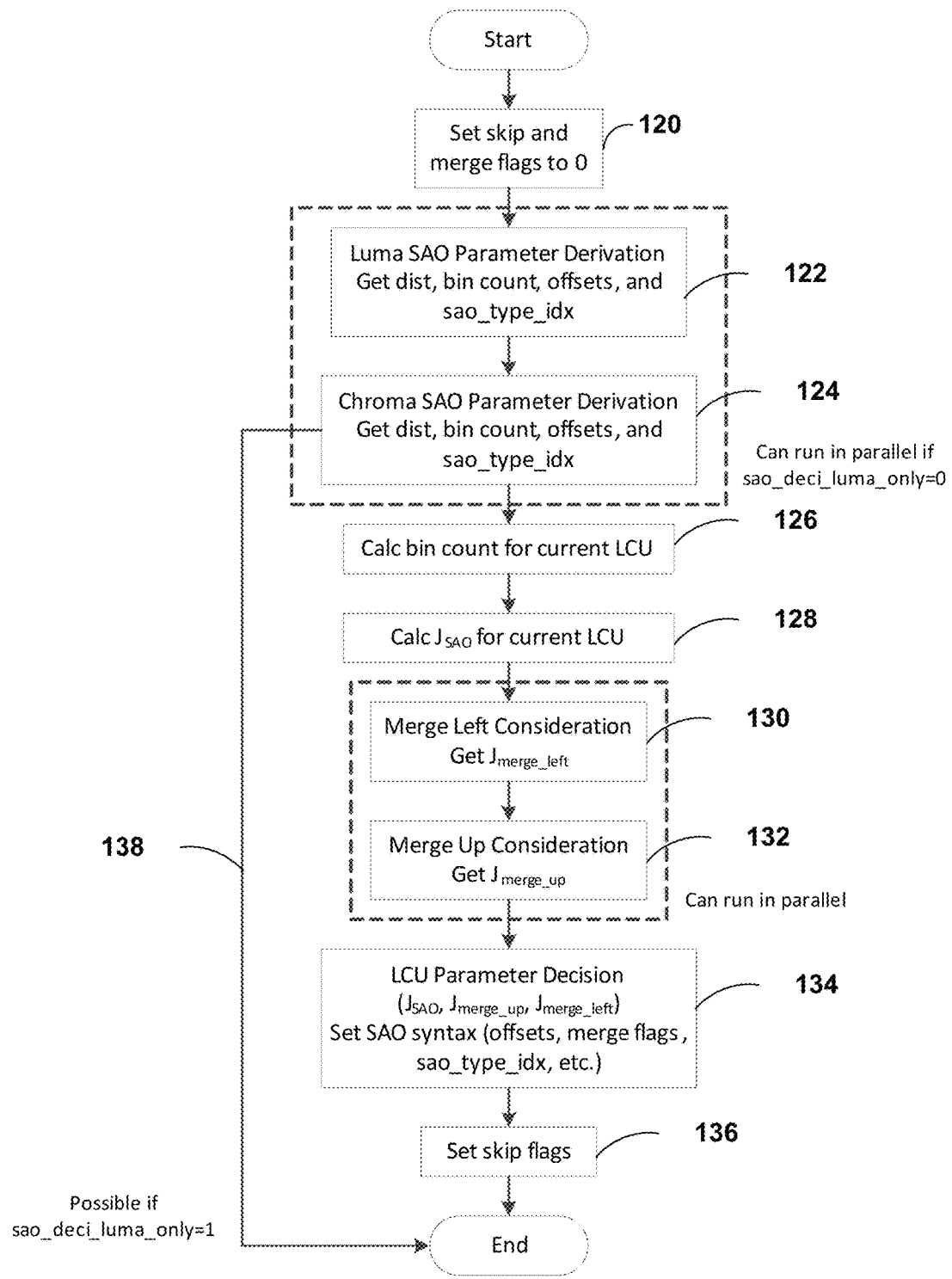
FIG. 6 is a conceptual diagram illustrating a high-level process for determining SAO filtering modes in accordance with the techniques of this disclosure.

FIG. 6 is a conceptual diagram illustrating a high-level process for determining SAO filtering modes in accordance with the techniques of this disclosure. A compatible video encoder, such as video encoder 20 may perform the techniques illustrated in the flow diagram of FIG. 6.

In the example of FIG. 6, video encoder 20 initially sets all skip and merge flags equal to zero (120). As described above, the skip and merge flags are syntax elements indicate whether video encoder 20 uses the SAO mode and parameters from a neighboring LCU relative to the current LCU. Video encoder 20 may later modify the values of the skip and merge flags, as described in greater detail below.

The inputs to the example of FIG. 6 that video encoder 20 utilizes include the original pixels from current LCU and post-deblocked and pre-deblocked pixels from the current LCU. When determining whether to utilize SAO skip mode (referred to as SAO skip consideration), video encoder 20 may require that the sao_deci_luma_only has previously been signaled as true. When considering whether to utilize merge left mode, or merge left mode, video encoder 20 may require SAO parameters from a left-neighboring LCU (if the left LCU is available) as follows. The SAO parameters that video encoder 20 may require from the left-neighboring LCU may include: left_sao_type_idx_luma/chroma, left_sao_band_position_luma/Cb/Cr, left_sao_eo_class_luma/chroma, left_offsets$_{luma}$, left_offsets$_{Cb}$, and left_offsets$_{Cr}$ as well as left_bo_hist_peak$_{luma}$, left_bo_hist_peak$_{Cb}$, and left_bo_hist_peak$_{Cr}$. To consider utilizing merge up mode, video encoder 20 may require the following SAO parameters from a top-neighboring LCU (if the top-neighboring LCU is available): up_sao_type_idx_luma/chroma, up_sao_band_position_luma/Cb/Cr, up_sao_eo_class_luma/chroma, up_offsets$_{luma}$, up_offsets$_{Cb}$, and up_offsets$_{Cr}$, as well as up_bo_hist_peak$_{luma}$, up_bo_hist_peak$_{Cb}$, and up_bo_hist_peak$_{Cr}$.

Next, video encoder 20 derives the luma SAO parameters (shown in FIG. 6 as Luma SAO Parameter Derivation Get dist, bin count, offsets, and sao_type_idx) (122) and the chroma SAO parameters (shown in FIG. 6 as Chroma SAO Parameter Derivation Get dist, bin count, offsets, and sao_type_idx) (124). If the sao_deci_luma flag is equal to zero, video encoder 20 may derive the parameters for luma and chroma SAO in parallel. To determine the luma and chroma SAO parameters, video encoder 20 determines a distortion value ("dist"), bin count, offsets, and SAO mode (e.g. band offset or edge offset). Video encoder 20 signals the SAO mode using the sao_type_idx parameter value. The details of performing luma SAO parameter derivation will be described below in greater detail with respect to FIGS. 7-9. The details of performing chroma SAO parameter derivation will be described below in greater detail with respect to FIGS. 10-12.

More particularly, in step 120, video encoder 20 may set skip_sao_luma=0 and skip_sao_chroma=0, sao_merge_left_flag, and sao_merge_up_flag to 0. At this point, skip_sao_luma/chroma=1 is the same as sao_type_idx_luma/chroma=0. Video encoder 20 maintains these as separate signals in case of an exemplary implementation in which advance knowledge of this signal (for example in one embodiment SAO chroma may be early skipped) may be used to disable hardware operation in video encoder 20 and thus save power and/or processing cycles.

After determining chroma and luma SAO parameters, where applicable, video encoder 20 determines a bin count for the current LCU (126), and calculates a cost, referred to as J$_{SAO}$, of performing SAO filtering on the current LCU (128). J$_{SAO}$ refers to the cost of performing SAO filtering using the SAO mode that optimizes a rate-distortion cost function.

After determining J$_{SAO}$, video encoder 20 may be configured to determine costs for performing merge left SAO filtering (130) and merge up SAO filtering (132). In some examples, video encoder 20 may determine the costs in parallel. The process of determining the costs for merge left and merge up SAO filtering are discussed in greater detail below with respect to FIG. 13. In some examples, video encoder 20 may be configured to calculate the costs for merge left SAO filtering, referred to as J$_{merge\_left}$, and the cost for merge up SAO filtering, referred to as J$_{merge\_up}$, in parallel.

Responsive to determining the costs for merge SAO filtering, video encoder 20 makes final SAO parameter decisions for the current LCU based on the costs: J$_{SAO}$, J$_{merge\_left}$, and J$_{merge\_up}$ (334). Video encoder 20 may decide LCU parameters by minimizing over J$_{SAO}$, J$_{merge\_left}$, and J$_{merge\_up}$, i.e. selecting the parameters associated with the least cost.

If merge left has lowest cost, video encoder 20 replaces the values of best_sao_type_idx_luma/chroma, best_sao_band_position_luma/Cb/Cr, best_sao_eo_class_luma/chroma, offsets$_{luma}$, offsets$_{Cb}$, and offsets$_{Cr}$ with the values of left_sao_type_idx_luma/chroma, left_sao_band_position_luma/Cb/Cr, left_sao_eo_class_luma/chroma, left_offsets$_{luma}$, left_offsets$_{Cb}$, and left_offsets$_{Cr}$, respectively. In this case, video encoder 20 sets sao_merge_left_flag to 1.

If merge up has lowest cost, video encoder 20 is configured to replace the values of best_sao_type_idx_luma/chroma, best_sao_band_position_luma/Cb/Cr, best_sao_eo_class_luma/chroma, offsets$_{luma}$, offsets$_{Cb}$, and offsets$_{Cr}$ with the values of up_sao_type_idx_luma/chroma, up_sao_band_position_luma/Cb/Cr, up_sao_eo_class_luma/chroma, up_offsets$_{luma}$, up_offsets$_{Cb}$, and up_offsets$_{Cr}$, respectively. Video encoder 20 also sets sao_merge_up_flag to 1.

The final parameter decisions include the offsets (if any) for the current LCU, the values of merge flags, which indicate whether the SAO parameters from the top or left-neighboring LCU should be used as the SAO parameters for the current LCU, and the sao_type_idx value, among others. Video encoder 20 is configured to encode syntax elements corresponding to the final SAO parameters. Finally, video encoder 20 is configured to encode any skip flags (136), and terminate LCU SAO encoder decision-making. If best_sao_type_idx_luma is set to 0, video encoder 20 sets skip_sao_luma to 1. If best_sao_type_idx_chroma is 0, video encoder 20 sets skip_sao_chroma to 1.

Additionally, in instances in which the flag sao_deci_luma_only is equal to one, video encoder 20 may be configured to perform luma SAO filtering, and not to consider chroma, merge, or skip modes. In some examples, if sao_deci_luma_only is equal to one, video encoder 20 may be configured to perform only luma and/or chroma SAO filtering, but not to consider merge filtering and skip SAO modes (138).

The output of the example process shown in FIG. 6 includes the syntax parameters: sao_merge_left_flag, sao_merge_up_flag, best_sao_type_idx_luma/chroma, best_sao_band_position_luma/Cb/Cr, best_sao_eo_class_luma/chroma, offsets$_{luma}$, offsets$_{Cb}$, and offsets$_{Cr}$. Video encoder 20 buffers the aforementioned syntax values in the line buffer (e.g., in a vertex stream processor) for merge up processing in the bottom-neighboring LCU of the next row, as well as internally for merge left processing in the right-neighboring LCU. In addition, the output includes auxiliary parameters skip_sao_luma and skip_sao_chroma that control whether SAO is applied to current LCU samples, as well as parameters bo_hist_peak$_{luma}$, bo_hist_peak$_{Cb}$, and bo_hist_peak$_{Cr}$ that are buffered in the line buffer as well in internally (e.g., to support merge mode processing).

In some examples, the order that video encoder 20 evaluates certain modes and components may not be the same as the order described in FIG. 6. For example, the method of FIG. 6 illustrates video encoder 20 evaluating luma before chroma, and EO before BO. In some examples, video encoder 20 may evaluate BO prior to EO. Video encoder 20 may also evaluate luma at the same time as chroma, in which case early termination of chroma (described below) would not be possible.

In some examples, video encoder 20 may evaluate merge modes plus SAO OFF prior to evaluating BO and FX) for luma. By doing so, video encoder 20 may perform early termination of EO and BO decision (i.e. skip EO and BO decision) if the merge cost or SAO OFF cost is below a threshold (this threshold may be determined using a temporal or spatial neighborhood).

In yet another example, video encoder 20 may also give priority to one mode versus another when costs are equal. For example, merge left may have higher priority than merge up. Such a strategy may prioritize bit rate over quality. Similarly, BO may have higher priority than EO, and SAO OFF may have higher priority than either BO or EO. Last, BO and EO may have higher priority than merge modes (such a strategy would probably prioritize quality over bit rate). The prioritization and order of decision steps may thus impact the quality-bit rate trade-off.

Figure 7:
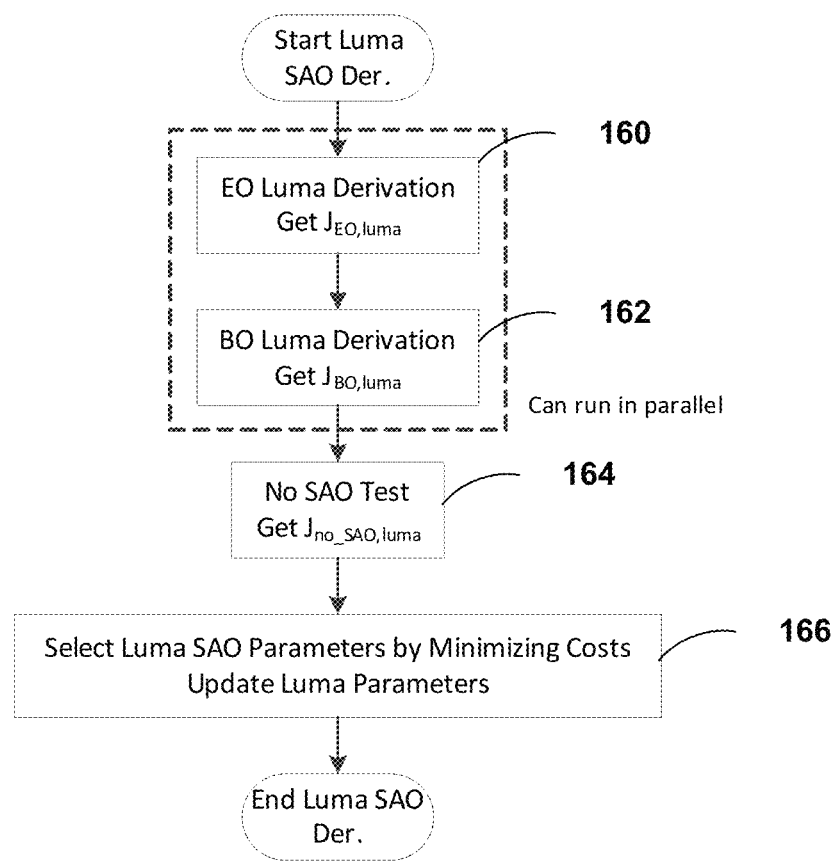
FIG. 7 is a conceptual diagram illustrating a process for performing luma SAO derivation in accordance with the techniques of this disclosure.

FIG. 7 is a conceptual diagram illustrating a process for performing luma SAO derivation in accordance with the techniques of this disclosure. In the method of FIG. 7, video encoder 20 may be configured to perform EO luma derivation to determine a cost of performing the EO luma filtering (160). The cost is referred to as $J_{EO,luma}$. Video encoder 20 is further configured to perform BO luma derivation to determine a cost for the BO luma filtering, referred to as $J_{BO,luma}$ (162). In some examples, video encoder 20 may be configured to perform steps 160 and 162 in parallel. Video encoder 20 calculates the cost of 60 mode filtering in step 162 as $J_{BO,luma}$=dist_B[Y]+λ×(sao_bo_luma_bias+bincount1$_{BO,luma}$). In the previous equation, sao_bo_luma_bias value may be arbitrary or may be fixed to zero, bincount1$_{BO,luma}$ is an estimated bincount for the luma band offset, dist_B[Y] is the computed distortion for band offset, and λ is a Lagrange multiplier.

Responsive to determining the costs $J_{BO,luma}$ and $J_{EO,luma}$, video encoder 20 is configured to perform a test to determine the cost of not performing SAO filtering, i.e. signaling SAO skip mode (164), The cost of not performing SAO is referred to as $J_{no\_SAO,luma}$.

Responsive to calculating the cost of not performing SAO (164), video encoder 20 is further configured to select a set of luma SAO parameters that have the minimum cost an update the luma parameters (166), The costs are referred to as $J_{EO,luma}$ Video encoder 20 then outputs the cost, which is later compared against other SAO costs.

To select between EO, BO, and no SAO modes (step 166), video encoder 20 is further configured to Minimize the rate-distortion costs over $J_{EO,luma}$, $J_{no\_SAO,luma}$ and $J_{BO,luma}$ and attempts to determine optimal luma parameters by selecting the SAO mode option with minimum R-D cost. Selecting between EO, BO, and SAO modes may be synonymous with minimizing costs and updating luma parameters as illustrated in step 166 in some examples. If video encoder 20 selects EO mode, video encoder 20 stores the computed distortion as: dist_X[Y]=dist_E$_k$[Y], bincount$_{luma}$=bincount1$_{EO,luma}$, offsets$_{luma}$=offsets$_{EO,luma}$ and best_sao_type_idx_luma=2. If video encoder 20 selects BO mode, video encoder 20 determines the computed distortion as: dist_X[Y]=dist_B[Y], bincount$_{luma}$=bincount1$_{BO,luma}$, offsets$_{luma}$=offsets$_{BO,luma}$ and best_sao_type_idx_luma=1. If video encoder 20 selects SAO skip mode, i.e. that no SAO is performed, and video encoder 20 stores dist_X[Y]=0, bincount$_{luma}$=bincount(0) and best_sao_type_idx_luma=0.

Figure 8:
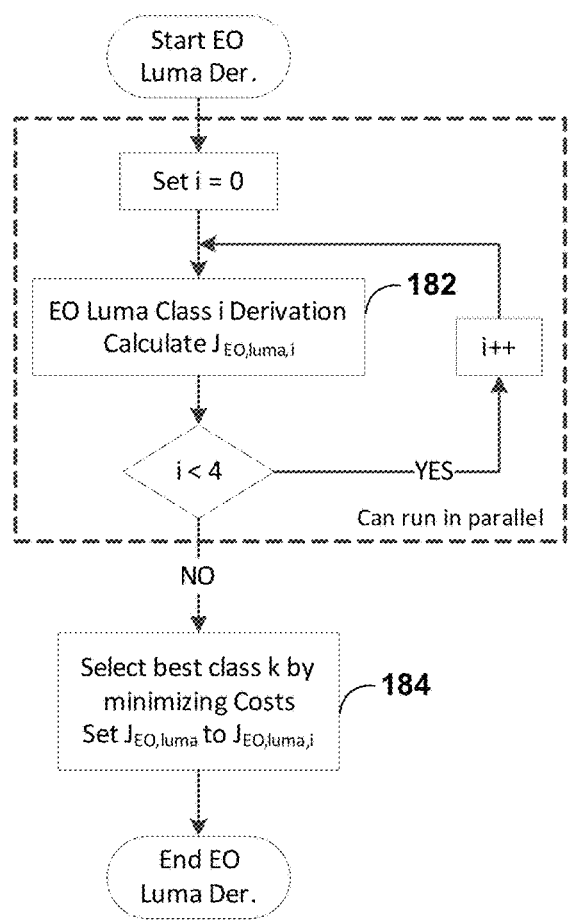
FIG. 8 is a flow diagram that illustrates a process for performing edge offset (EO) luma SAO cost derivation in accordance with the techniques of this disclosure.

FIG. 8 is a flow diagram that illustrates a process for performing edge offset (EO) luma SAO cost derivation in accordance with the techniques of this disclosure. As discussed above, there are four classes for EO SAO. In the method of FIG. 8, video encoder 20 is configured to, for each of the offset classes (from a first offset class i=0 to a final offset class i=3), calculate a cost for each class, i.e. perform EO luma class derivation to calculate the cost of each class, denoted as $J_{EO,luma,i}$ (182), and select the class that has the lowest associated cost (184). To select the class with the lowest, cost, video encoder 20 may select the best luma class k that minimizes costs, and may set $J_{EO,luma}$ equal to $J_{EO,luma,i}$. In some examples, video encoder 20 is configured to test multiple classes in parallel with each other. The clipping operations and iterative division techniques described below with respect to FIG. 8 may improve the performance of encoding EO and BO modes in accordance with the techniques of this disclosure.

As described above with respect to FIGS. 2A-2D when video encoder 20 select EO mode, video encoder 20 encodes an edge offset classifier syntax element, sao_eo_class_luma/chroma. Before signaling sao_eo_class_luma/chroma, video encoder 20 performs parameter derivation, and evaluates the rate-distortion costs for each edge offset classifier (sao_eo_class_luma), where i=[0, 1, 2, 3], video encoder 20 performs the edge offset derivation for each input class i, and on the Y channel (luma) samples of the current LCU. As part of the luma EO parameter derivation, video encoder 20 determines a distortion value for each luma edge class, denoted as distE$_i$[Y], as well as offset for each edge class (offsets$_{EO,luma,i}$) a sum of the pixels in each class (SOP$_{EO,luma,i}$), a number of pixels in each class (NOP$_{EO,luma,i}$), and a bin count (bincount$_{EO,luma,i}$). The bincount is an estimate of the number of bins that is needed to CABAC entropy encode the encoded parameters (e.g. the encoding mode, offsets, etc.) for each of the EO luma classifiers i=[0, 1, 2, 3].

For each EO class, that video encoder 20 considers, where the class is denoted by the variable i, and for the luma components of the current LCU, video encoder 20 outputs and stores a distortion value for each class distE$_i$[Y], offsets for each class (offsets$_{EO,luma,i}$), a sum of pixels for that class (SOP$_{EO,luma,i}$), a number of pixels in each class (NOP$_{EO,luma,i}$), and a bin count bincount$_{EO,luma,i}$, as described above with respect to FIG. 6. Based on the distortion, video encoder 20 is configured to determine a cost for each class, referred to as $J_{EO,luma,i}$ as illustrated in (182). Video encoder 20 may calculate $J_{EO,luma,i}$ as:

$$J_{EO,luma,i}=\text{dist}_{E_i}[Y]+\lambda\times(sao\_eo\_luma\_bias+sao\_eo\_class\_yj\_bias+\text{bincount}_{EO,luma,i}).$$

In step 184, video encoder 20 further selects the value of $J_{EO,luma,i}$ (i=[0, 1, 2, 3]) that has the minimum cost. Video encoder 20 also sets the values of offsets$_{EO,luma}$ equal to offsets$_{EO,luma,k}$, and the value of $J_{EO,luma}$ equal to: $J_{EO,luma}$, $k - \lambda \times$ sao_eo_class_y (k+1)_bias. In some examples, video encoder 20 may set the value of sao_eo_luma_bias and sao_eo_class_yj_bias to arbitrary values. video encoder 20 may use set bias values in order to bias the SAO mode decision towards particular modes. In other examples, video encoder 20 may fix the bias values to zero. Additionally, video encoder 20 may assign sao_eo_class_y (k+1)_bias to arbitrary values in some examples, and to zero in other examples.

To calculate the edge offset values for each class, video encoder 20 tests a given sao_eo_class EO classifier i for the given component c. Given the EO classifier index i, video encoder 20 applies the classifier to derive the edgeIdx of each reconstructed pixel ($r_c(x,y)$) of the current LCU. Video encoder 20 calculates edgeIdx according to Table 4, below:

TABLE 4

$$\text{Sign}(x) = \begin{cases} 1; & x > 0 \\ 0; & x = 0 \\ -1; & x < 0 \end{cases}$$

edgeIdx = 2 + $\Sigma_k$( Sign( recPicture[ $xS_i$ ][ $yS_j$ ] − recPicture[ $xS_i$ + hPos[ k ] ][ $yS_j$ + vPos[ k ] ] ) ) with k = 0 . . . 1

When edgeIdx is equal to 0, 1, or 2, it is modified as follows.
edgeIdx = ( edgeIdx = = 2 ) ? 0 : ( edgeIdx + 1 )
saoPicture[ $xS_i$ ][ $yS_j$ ] = Clip3( 0, ( 1 << bitDepth ) − 1, recPicture[ $xS_i$ ][ $yS_j$ ] + SaoOffsetVal[ cIdx ][ rx ][ ry ][ edgeIdx ] )

A reconstructed pixel refers to a pixel coming from a block of the deblocking filter, e.g. deblocking filter unit 72 of FIG. 4. Due to deblocking filter dependencies, not all pixels of an LCU or neighboring the LCU will be deblocked when a hardware pipeline processes the current LCU. Video encoder 20 may leave bottom- and right-neighboring samples relative to the LCU unfiltered, and may deblock those samples once the subsequent right- and bottom-neighboring LCUs are processed. Thus, in some examples, video encoder 20 may apply calculations to determine rate-distortion costs only on deblocked samples, or in a combination of deblocked, partially deblocked (only vertical edge filtering has been applied, and unfiltered (not deblocked) samples, for example, for the right- and bottom-neighboring samples of the currently-processing LCU. Also, the use of non-deblocked pixels to derive SAO parameters may be valid only for selecting SAO parameters. Once the parameters are selected, video encoder 20 may apply SAO using fully deblocked samples.

To calculate the offset for each edgeIdx (or EO class), video encoder 20 computes a sum of differences between original and reconstructed pixel (sample) values for each edgeIdx value, where edgeIdx∈(1, 2, 3, 4). video encoder 20 calculates the sum of pixels (SOP) (SOP_$E_i$[c][edgeIdx]) as follows:

SOP_$E_i$[c][edgeIdx]=$\Sigma_{(x,y) \in EO_i}(p_c(x,y) - r_c(x,y))$, where c is the channel (e.g. chroma "Cb", chroma "Cr" or luma "Y"), where $p_c(x,y)$ is the original sample value at coordinate (x,y), and $r_c(x,y)$ is the reconstructed sample at (x,y).

In accordance with the techniques of this disclosure, video encoder 20 may be configured reduce the bit width and precision of subsequent operations when performing edge offset calculations. For example, video encoder 20 may clip the difference of the original pixels minus reconstructed pixels to the range [−32, 31] such that 6 signed bits are a sufficient number of bits to represent the difference quantity. For each pixel in a particular edge class, $EO_i$, video encoder 20 adds the clipped difference to the current value of the SOP (the sum is set to zero at the beginning of iterating through all pixels for each class). Video encoder 20 again performs clipping on SOP_$E_i$[c][edgeIdx] in the range of [−4095, 4095] and the SOP is updated with the result of this clipping. This may be written as follows:

SOP(n)=Clip3(−4095,4095,SOP(n−1)+Clip3(−32,31, pixel_diff(n))), where n is the index of pixel in the set ($EO_i$), and pixel_diff (n) is the difference of original minus reconstructed pixel with index n in set of pixels that were classified within $EO_i$ by video encoder 20. Video encoder 20 performs this last clipping every time that video encoder 20 adds the pixel difference for each pixel to the sum of differences. This last clipping ensures that 13 bits are sufficient to represent the SOP (sum of pixels) information.

To calculate the offsets for each edgeIdx (e.g., SAO EO class), video encoder 20 calculates a number of reconstructed pixels (NOP) classified with an edgeIdx for a given sao_eo_class i, referred to as NOP_$E_i$[c][edgeIdx]. In some examples, video encoder 20 is configured to clip NOP_$E_i$ [c][edgeIdx] to the range [0, 1023], such that 10 bits are required to represent NOP_$E_i$[c][edgeIdx] in hardware. The clipped version is stored and used in all subsequent calculations (including merge cost calculations).

To determine the offset for class i, for each edgeIdex edgeIdx∈(1, 2, 3, 4), video encoder 20 may be configured to divide each SOP_$E_i$[c][edgeIdx] by the corresponding value of NOP_$E_i$[c][edgeIdx]. Video encoder 20 then rounds and clips the result of the division. The equation used to calculate the offset is thus:

Offset$_{E_i[c][edgeIdx]}$=clip(round(SOP_$E_i$[c][edgeIdx]/ NOP_$E_i$[c][edgeIdx]),vmin,vmax.

In this example, the clip range differs: (vmin, vmax)=(0, 7) for edgeIdx=1 or 2 and (vmin, vmax)=(−7, 0) for edgeIdx=3 or 4. In one example, the division of SOP by NOP is performed in a way that is hardware-friendly. For example, video encoder 20 sets a special counter and an iteration counter (e.g., a software variable, register, hardware counter, etc.) to zero. Video encoder 20 also sets a temporary variable equal to the absolute value of the SOP value.

Because the absolute value of the offset may not be greater than 7 (due to the clipping), video encoder 20 executes an iterative loop to iteratively subtract the NOP from the temporary variable until the temporary variable is less than or equal to zero, or until 7 iterations have been performed. Each time video encoder 20 subtracts the NOP from the temporary video encoder 20 increments the iteration counter. Additionally, each time video encoder 20 subtracts the NOP value from the temporary variable and the resulting temporary variable is greater or equal than zero, video encoder 20 increments the special counter. At the end of this operation the special counter yields the absolute value of the offset for a particular class or edgeIdx. Video encoder 20 determines the sign of the offset from the sign of the SOP. However, if the absolute value is 0, video encoder 20 determines that the sign is positive.

Thus, in accordance with the techniques of this disclosure, video encoder 20 may be configured to encode samples of a LCU of a coded video picture using a sample adaptive offset SAO mode. To encode the samples of the CU using the SAO mode, video encoder 20 may calculate differences between corresponding reconstructed samples of the LCU and original samples of the LCU, clip a number of bits from each of the differences to form clipped differences, sum the clipped differences to form a sum of differences, clip the sum of differences to form a clipped sum of differences, calculate a number of the reconstructed samples, clip a number of bits from the number of reconstructed samples to form a clipped number of samples, and divide the clipped sum of differences by the clipped number of samples to produce an offset for the LCU.

Next, video encoder 20 computes the distortion for class i, denoted as dist_$E_i$[c]. Video encoder 20 computes the distortion as:

$$\text{dist}\_E_i[c] = \Sigma_k(\text{NOP}\_E_i[c][k] \times \text{Offset}\_E_i[c][k] \times \text{Offset}\_R_i[c][k] - \text{SOP}\_E_i[c][k] \times \text{Offset}\_E_i[c][k] \times 2),$$

where k=[1, 2, 3, 4]. The distortion calculation may be performed in accordance with the calculation described in C.-M. Fu et al, which was previously cited above.

To derive the luma parameters, video encoder 20 calculates a rate-distortion cost for each EO class. The cost is denoted as $J_{EO,luma,i}$, and is calculated as: $J_{EO,luma,i}$=dist_$E_i$[Y]+$\lambda \times$(sao_eo_luma_bias+sao_eo_class_yj_bias+bincount$_{EO,luma,i}$), where sao_eo_class_yj_bias is some bias factor for each EO class. In some examples, video encoder 20 may assign sao_eo_luma_bias and sao_eo_class_yj_bias arbitrary values to bias the mode decision selection towards particular modes. In other examples video encoder 20 may fix the value of the sao_eo_luma_bias and sao_eo_class_yj_bias variables equal to zero.

The last general operation that video encoder 20 performs in step 184 to determine the luma SAO parameter is to minimize $J_{EO,luma,i}$. In particular video encoder 20 derives a variable, best_sao_eo_class_luma=k, as the index i (corresponding to the EO classes) with the minimum cost. Video encoder 20 then sets offsets$_{EO,luma}$ equal to offsets$_{EO,luma,k}$, and $J_{EO,luma}$=$J_{EO,luma,k}$−$\lambda \times$sao_eo_class_y(k+1)_bias. Video encoder 20 may assign arbitrary values to sao_eo_class_y(k+1) bias in one example, or zero in other examples.

To derive the BO parameters for luma, video encoder 20 may be configured to perform BO derivation for the luma component (c=Y). Video encoder 20 then stores outputs and stores parameters a distortion value for the luma samples in each of the bands (dist_B[Y]), a variable indicating the best band position (best_sao_band_position_luma), the peak position of the 32 bands (bo_hist_peak$_{luma}$), the offsets for each of the bands (offsets$_{BO,luma}$), a sum of the pixel values in each of the bands(SOP$_{BO,luma}$), a number of pixels in each of the bands (NOP$_{BO,luma}$), and an estimated bincount for band offset (bincount0$_{BO,Y}$). Calculating the bin count is discussed in greater detail below.

Figure 9:
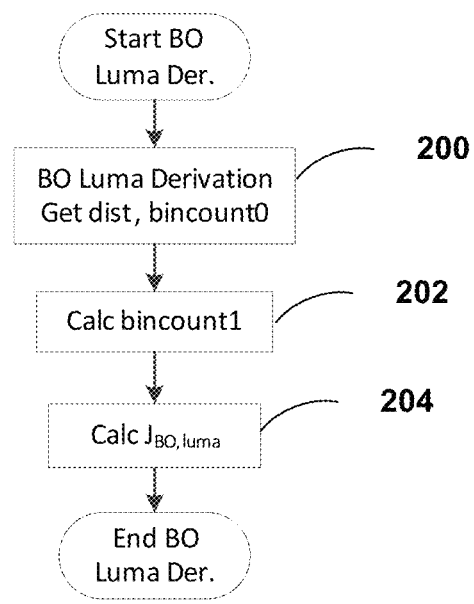
FIG. 9 is a flow diagram illustrating a process for performing luma band offset derivation in accordance with the techniques of this disclosure.

FIG. 9 is a flow diagram illustrating a process for performing luma band offset derivation in accordance with the techniques of this disclosure. In the example of FIG. 9, video encoder 20 is configured to perform BO luma derivation, which involves determining a distortion and a bincount0 (i.e. performing BO luma derivation to determine the distortion, dist, and the bincount, bincount0) (200). Responsive to step 200, video encoder 20 is further configured to calculate a bincount1 (202), and to calculate a cost for encoding the luma channel with the BO mode, $J_{BO,luma}$ (204). The input to this process is c, as described above with respect to EO for luma. The outputs of this process are parameters: dist_B[Y], best_sao_band_position_luma, bo_hist_peak$_{luma}$, offsets$_{BO,luma}$, SOP$_{BO,luma}$, NOP$_{BO,luma}$, and bincount0$_{BO,Y}$, which are similar to their EO luma equivalents.

The input to the luma BO filtering process is c, an index that indicates which channel video encoder 20 is processing. Based on c, video encoder 20 reads the post- and pre-deblocked pixels (samples) from the appropriate channel, in this case, the luma channel. The outputs to the process of FIG. 9 include a distortion value, dist_$E_i$[c], the offsets Offset_$E_i$[c][edgeIdx] (four of them) and SOP_$E_i$[c][edgeIdx] and NOP_$E_i$[c][edgeIdx], and, if the component denotes luma, the bin count bincount$_{EO,luma,i}$. As above, SOP, and MOP are a sum of pixel differences between pre- and post-deblocked values. NOP is the number of pixels in each band.

In accordance with the techniques of this disclosure, video encoder 20 may not test all possible 32 values of the band position during BO offset derivation. Instead, video encoder 20 uses histogram analysis to select the band position (sao_band_position). An explanation of the derivation algorithm for each component LCU (e.g., Y, Cb, or Cr) follows.

First, video encoder 20 determines a band position, sao_band_position$_c$, using histogram analysis. To compute the histogram, video encoder 20 first bins each of the samples of the LCU into one of the 32 channels, stored in an array bin_count[32]. In accordance with the techniques of this disclosure, video encoder 20 classifies original pixels $p_c(x,y)$ into a 32-bin histogram using the BO classifier (bandIdx (x,y)=$p_c$(x,y)>>3, for 8-bit content). In one example, video encoder 20 uses an early termination scheme to save hardware cycles. Video encoder 20 visits pixels in raster scan order, and according to their classification, video encoder 20 increments the bincount corresponding to the bandIdx of each sample.

Video encoder 20 terminates histogram calculation once either one of the two following conditions are met: (1) either all pixels in the component plane have been processed, or (2) the incremented bincount value (as a result of processing the current pixel) is equal to half the number of the pixels in the component (e.g., Y, Cr, Cb) plane (i.e., the threshold is 512 pixels for luma and 128 for pixels chroma, for a 32×32 LCU). A bincount that is already at half the number of possible bins may not be smaller than any other bincount. When video encoder 20 terminates processing, video encoder 20 sets the bincount value to its maximum. There may be content where a component has only two non-zero and (consequently) equal-valued bincounts. Video encoder 20 continues this process to ensure unambiguous selection of the histogram maximum (e.g., the maximum number of samples in a bin) since the histogram derivation terminate early once one of the bincounts reaches the threshold.

Next, video encoder 20 selects the sao_band_position$_c$ as the index m of bin count with the maximum value bin count[m] value (histogram peak) minus some constant h (bo_hist_peak$_c$=m−h). In one example in accordance with the techniques of this disclosure, video encoder 20 may set the constant (h) to 1.

Responsive to determining the band position for the original pixels, video encoder 20 computes bandIdx of each reconstructed pixel, $r_c(x,y)$, of the current LCU (p(x,y)) using the BO classifier (bandIdx (x,y)=$r_c$(x,y)>>3, for 8-bit content). As explained above, some or all of the reconstructed pixels may not be fully deblocked.

Similar to the process described with respect to EO offset calculation, video encoder 20 also calculates the sum of the original minus the reconstructed pixels (SOP_B[c][bandIdx]=$\Sigma_{(x,y)\in bandIdx}(p_c(x,y)-r_c(x,y))$) as described above with respect FIG. 8 in the context of luma EO filtering. Video encoder 20 clips the sums and differences also as described above with respect to EO offset calculation. Video encoder 20 determines NOP_B[c][bandIdx] (the number of reconstructed pixels classified with bandIdx). In some examples, video encoder 20 clips the NOP_B value in the range of [0, 1023], such that 10 bits are required to represent the value in hardware. The clipped version is stored and used in all subsequent calculations (including merge cost calculations).

Video encoder 20 determines the offset for SAO_BO. For each bandIdx∈(0, . . . , 31), Offset_B[c][bandIdx]=clip (round(SOP_B[c][bandIdx]/NOP_B[c][bandIdx], −7, 7). where bandIdx is within the range (sao_band_position$_c$, . . . , sao_band_position$_c$+3). In one example in accordance with the techniques of this disclosure, the division of SOP by NOP is implemented in a similar way to the iterative subtraction of NOP from the absolute value of SOP and sign inheritance.

Video encoder 20 calculates the distortion for band SAO filtering as:

dist_B[c]=Σ$_k$(NOP_B[c][k]×Offset_B[c][k]×Offset_B[c][k]−SOP_B[v][k]×Offset_B[c][k]×2) with k==sao_bank_position$_c$, . . . ,sao_band_position$_c$+3.

The distortion calculation is described in the appendix of Chih-Ming Fu et al, "Sample Adaptive Offset in the HEVC Standard," IEEE Transactions on Circuits and Systems for Video Technology, Vol. 22, No. 12, December 2012. Bin counting per steps 200 and 202 are described in greater detail below in greater detail with respect to FIG. 13.

The techniques of this disclosure describe an improved technique for histogram derivation for BO filtering. Video encoder 20 may be configured to derive the sao_band_position for BO decision by taking a histogram of the original LCU pixels. Once the histogram is derived (with or without the optional early termination), the peak of histogram minus some constant is used to derive the sao_band_position syntax element. This relationship may be described as:

bo_hist_peak=max$_i$(bin_count(i)).

Subsequently, video encoder 20 may derive the band position as:

sao_band_position=bo_hist_peak−const.

Optimally video encoder 20 would be configured to derive this histogram using reconstructed samples. For complexity and parallelization reasons however, video encoder 20 may use the original samples with good results. While the described method for deriving the histogram is efficient and yields good quality, there may be room for improvement. An additional technique described herein may improve upon the sample-based histogram derivation by optimizing the way video encoder 20 selects peak of the histogram. As part of the aforementioned technique of deriving the histogram peak, video encoder 20 may select the group of four consecutive bins with the max sum as follows: bo_hist_peak=max$_i$(bin_count(i)+bin_count(i+1)+bin_count(i+2)+bin_count(i+3)). The four consecutive bands only send nonzero offsets. Thus, video encoder 20 may still derive the sao_band_position syntax element as sao_band_position=bo_hist_peak−const. Video encoder 20 may set the constant to zero some examples.

Figure 10:
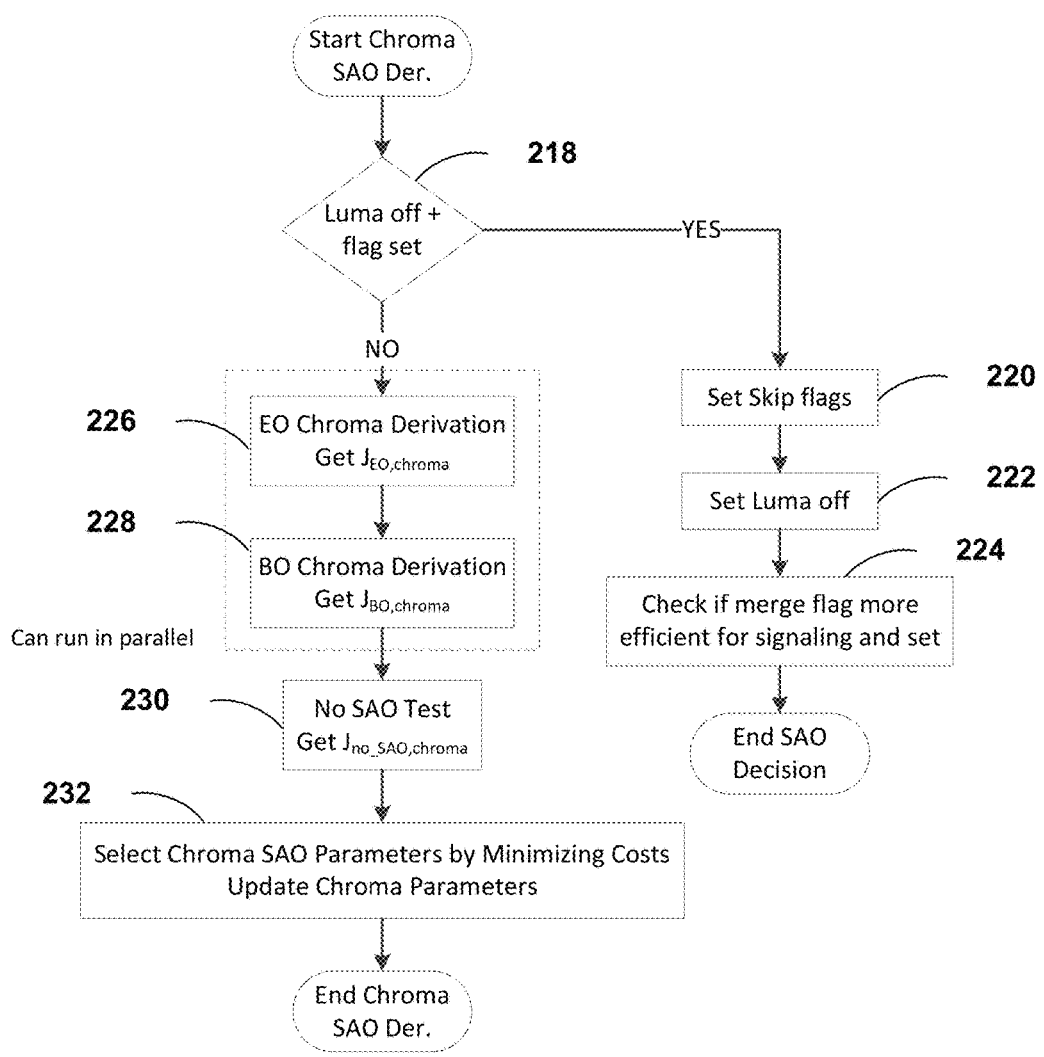
FIG. 10 is a flow diagram illustrating a method for performing chroma SAO derivation in accordance with the techniques of this disclosure.

FIG. 10 is a flow diagram illustrating a method for performing chroma SAO derivation in accordance with the techniques of this disclosure. In the example of FIG. 10, video encoder 20 determines whether the luma off+flag is set (218). When the flag is set, video encoder 20 sets skip flags (220), sets the luma SAO syntax value to off (222), and checks to see if signaling the merge flag would be more efficient than setting the skip flap (224).

If the luma flag is on, or another flag is set, video encoder 20 determines the cost of EO chroma SAO filtering (EO chroma derivation to get J$_{EO,chroma}$) (226), and the cost of BO chroma filtering (BO chroma derivation to get J$_{BO,chroma}$) (228). The costs for EO chroma and BO chroma are denoted as J$_{EO,chroma}$, J$_{BO,chroma}$. Next, video encoder 20 determines a cost for not performing SAO, J$_{no\_SAO,chroma}$ (No SAO Test, Get J$_{no\_SAO,chroma}$) (230), and updates and selects chroma SAO parameters that minimize the rate-distortion costs, i.e. have the lowest costs (232). Updating the chroma parameters may be a sub-step of step 232 in some examples.

In step 232, video encoder 20 is configured to minimize over (i.e. select one of) J$_{BO,chroma}$, J$_{no\_SAO,chroma}$, and J$_{EO,chroma}$ and determine optimal chroma parameters by selecting the option with the minimum cost. To select parameters with minimum cost, if EO is selected video encoder 20 stores dist_X[c]=dist_E$_k$[c] for c=Cb, Cr, bincount$_{chroma}$=bincount1$_{EO,chroma}$, offsets$_c$=offsets$_{EO,c}$ for c=Cb, Cr, and best_sao_type_idx_chroma=2. If BO is selected, video encoder 20 stores dist_X[c]=dist_B[c] for c=Cb, Cr, bincount$_{chroma}$=bincount1$_{BO,chroma}$, offsets$_c$=offsets$_{BO,c}$ for c=Cb, Cr, and best_sao_type_idx_chroma=1. If no SAO is selected, video encoder 20 stores dist_X[c]=0 for c=Cb, Cr, bincount$_{chroma}$=bincount(0) and best_sao_type_idx_chroma=0.

If the value best_sao_type_idx_luma is equal to 0, video encoder 20 may optionally test whether to skip chroma SAO decision altogether. This decision may be controlled through external means. In such a case, video encoder 20 applies the following steps:

(1) Sets skip_sao_luma and skip_sao_chroma both to 1.
(2) Sets best_sao_type_idx_chroma to 0.
(3) If the top LCU is available (within tile and slice boundaries, or allowed through some external means, e.g., by programming certain registers) then:
   a. Determine whether best_sao_type_idx_luma and up_sao_type_idx_luma are both 0. up_sao_type_idx_luma is set to the value of the sao_type_idx_luma syntax parameters of the top LCU, if available.
   b. Check if best_sao_type_idx_chroma and up_sao_type_idx_chroma are both 0. up_sao_type_idx_chroma is set to the value of the sao_type_idx_chroma syntax parameters of the top LCU, if available.
   c. If both above conditions (a. and b.) are true, video encoder 20 sets sao_merge_up_flag=1 and sao_merge_left_flag=0 and proceeds to jump, and/or terminate the process of any further SAO decision making.
(4) If the left LCU is available (within tile and slice boundaries, or allowed through some external means, i.e. by programming certain registers) then:
   a. Check if best_sao_type_idx_luma and left_sao_type_idx_luma are both 0. left_sao_type_idx_luma is the sao_type_idx_luma syntax parameter of the left LCU, if available.
   b. Determine whether best_sao_type_idx_chroma and left_sao_type_idx_chroma are both 0. left_sao_type_idx_chroma is set to the value of the sao_type_idx_chroma syntax parameter of the left LCU, if available,
   c. If both above conditions are true set sao_merge_up_flag=0 and sao_merge_left_flag=1 and terminate any further SAO decision-making.

Figure 11:
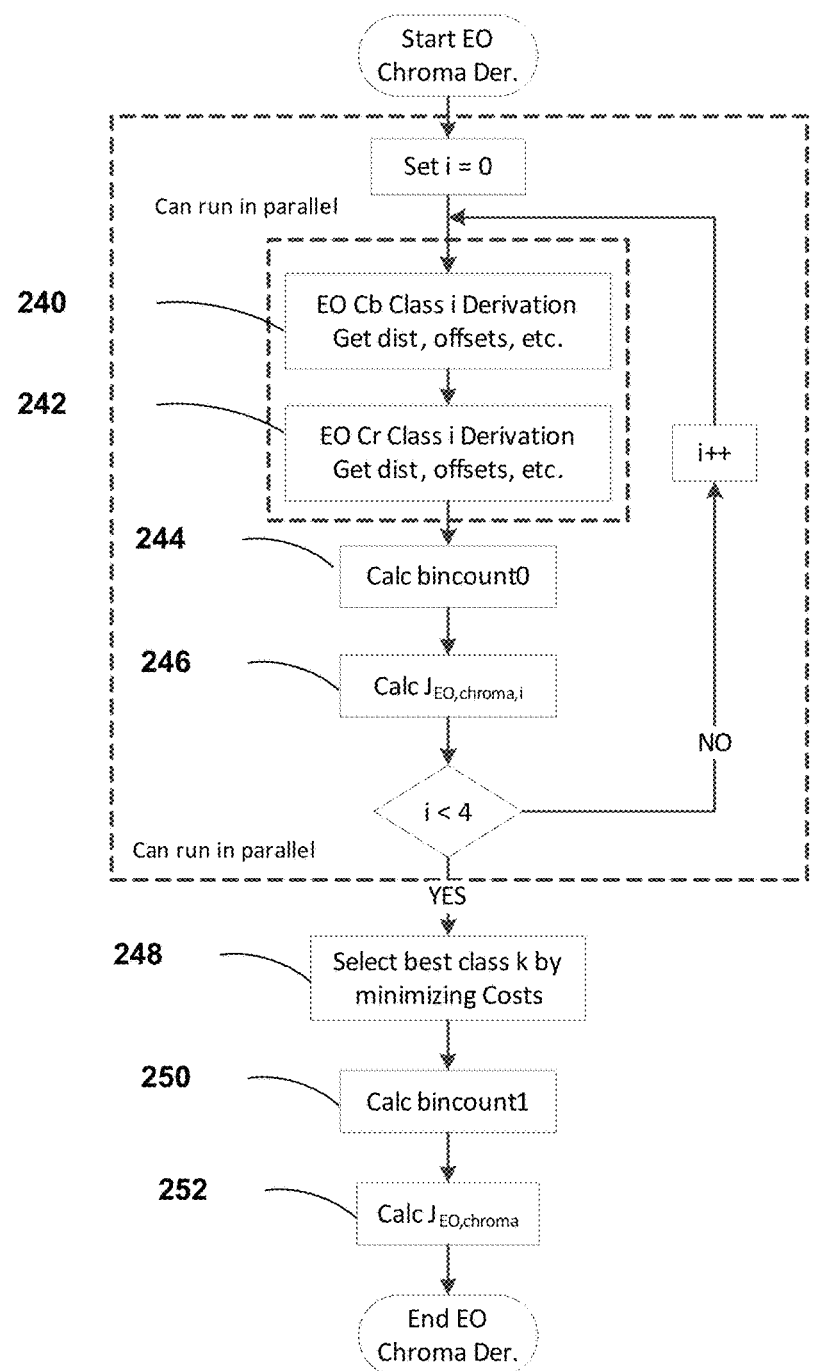
FIG. 11 is a flow diagram illustrating a process for performing edge offset chroma derivation in accordance with the techniques of this disclosure.

FIG. 11 is a flow diagram illustrating a process for performing edge offset chroma derivation in accordance with the techniques of this disclosure. In the example of FIG. 11, for each EO classifier (sao_eo_class_chroma) i=(0, 1, 2, 3), video encoder 20 is configured to: Perform EO derivation for inputs class=i and component c=Cb. Video encoder 20 output dist_$E_i$[Cb] and offsets$_{EO,cb,i}$, SOP$_{EO,cb,i}$, NOP$_{EO,Cb,I}$ as outputs (240) and perform EO derivation for inputs class=i and component c=Cr. Video encoder 20 outputs dist_$E_i$[Cr] and offsets$_{EO,Cr,i}$, SOP$_{EO,Cr,i}$, NOP$_{EO,Cr,I}$ as outputs (242).

Responsive to step 242, video encoder 20 may calculate bincount0$_{EO,chroma,i}$ (244), and calculate $J_{EO,chroma,i}$=dist_$E_i$[Cb]dist_$E_i$[Cr]+λ×(sao_eo_class_cj_bias+bincount0$_{EO,chroma,i}$). The sao_eo_class_cj_bias (j=i+1) may have arbitrary values in one or may be fixed to zero (246).

Once video encoder 20 finishes executing steps 240-246, video encoder 20 is then configured to minimize over $J_{EO,chroma,i}$ to derive best_sao_eo_class_chroma=k as the index i with the minimum cost (248). Video encoder 20 also sets offsets$_{EO,Cb}$ and offsets$_{EO,Cr}$ equal to offsets$_{EO,Cb,k}$ and offsets$_{EO,Cr,k}$, respectively. Video encoder 20 also calculates bincount1$_{EO,chroma}$, as described below, (250) and re-calculates the final cost as $J_{EO,chroma}$=dist_$E_k$[Cb]+dist_$E_k$[Cr]+λ×(sao_eo_chroma_bias+bincount1$_{EO,chroma}$) (252). The sao_eo_chroma_bias bias may have arbitrary values in one case, or may be fixed to zero.

Figure 12:
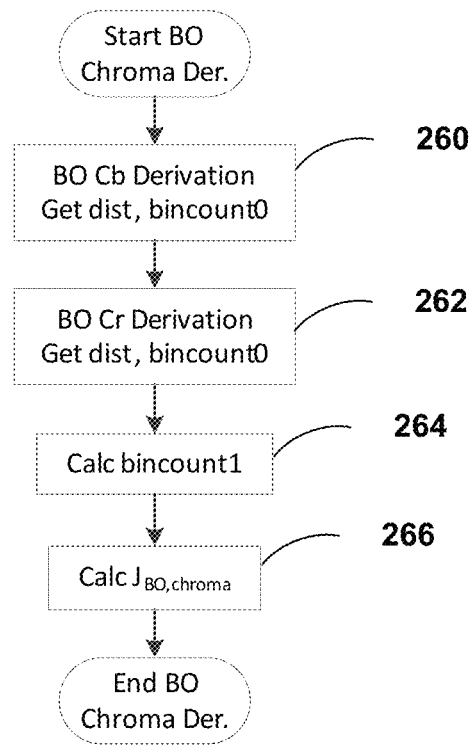
FIG. 12 is a flow diagram illustrating a process for performing band offset chroma derivation in accordance with the techniques of this disclosure.

FIG. 12 is a flow diagram illustrating a process for performing band offset chroma derivation in accordance with the techniques of this disclosure. In the examples of FIG. 12, video encoder 20 performs BO derivation for c=Cb as described above with respect to FIG. 9 in the context of luma BO derivation (260). The result of this step are outputs dist_B[Cb], best_sao_band_position_Cb, bo_hist_peak$_{Cb}$, offsets$_{BO,Cb}$, SOP$_{BO,Cb}$, NOP$_{BO,Cb}$, and bincount0$_{BO,Cb}$.

Video encoder 20 also performs BO derivation for c=Cr as described above for luma BO derivation with respect to FIG. 9 (262). The outputs for this step are dist_B[Cr] best_sao_band_position_Cr, bo_hist_peak$_{Cr}$, offsets$_{BO,Cr}$, SOP$_{BO,Cr}$, NOP$_{BO,Cr}$, and bincount0$_{BO,Cr}$.

Video encoder 20 also calculates bincountt1$_{BO,chroma}$, as described in greater detail below (264), and calculates the BO R-D (rate-distortion) cost as $J_{BO,chroma}$=dist_B[Cb]+dist_B[Cr]+λ×(sao_bo_chroma_bias+bincount1$_{BO,chroma}$). The sao_bo_chroma_bias syntax element may have an arbitrary value in one example or may be fixed to zero (266).

Figure 13:
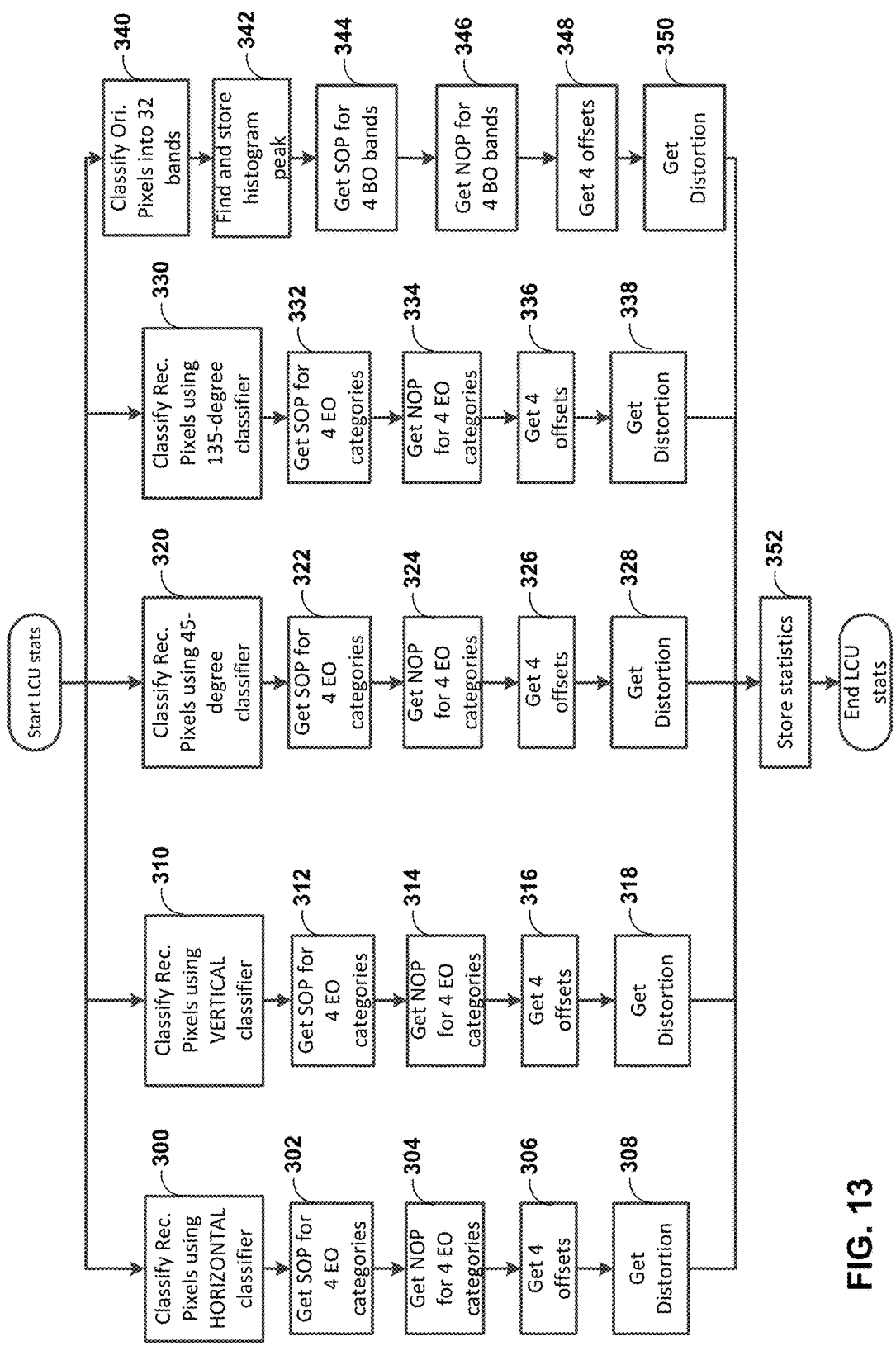
FIG. 13 is a flow diagram illustrating a process for performing SAO filtering in accordance with the techniques of this disclosure.

FIG. 13 is a flow diagram illustrating a process for performing SAO filtering in accordance with the techniques of this disclosure. In the method of FIG. 13, video encoder 20 may be configured to derive costs, offsets, distortion values, and other values for band each of the four EO classes, and BO mode. Video encoder 20 may be configured to perform the techniques illustrated with respect to FIG. 13 in parallel with the techniques illustrate in FIG. 14 in some examples.

In the example of FIG. 13, the four leftmost columns indicate the process by which video encoder 20 performs determination of EO parameters and rate-distortion costs for each of the four edge classifiers (horizontal, vertical, 45-degree, and 135-degree classifiers described in FIGS. 2A-2D). Video encoder 20 begins calculating the EO costs by classifying each of the pixels of the current channel using one of a horizontal, vertical, 45-degree, and 135-degree classifier filter shapes (steps 300, 310, 320, and 330, respectively).

Responsive to classifying each of the pixels using the edge classifier filters, video encoder 20 determines a sum of samples (SOP) for each of the four pixel categories using the conditions described in Table 3, above. The sum of samples is a sum of differences between original and reconstructed samples of the current LCU (steps 302, 312, 322, and 332, respectively).

Responsive to determining the sum of pixels for each classifier, video encoder 20 determines a number of samples classified in each of the 4 categories, as defined in Table 3, above (steps 304, 314, 324, and 334). Video encoder 20 then divides the sum of samples by the number of samples to determine the four offsets for each of the four sample categories (steps 306, 316, 326, and 336). Video encoder 20 may clip the results calculated as part of calculating the differences, sum of differences, and/or the number of pixels, in accordance with the techniques of this disclosure. Responsive to determining the offsets associated with each pixel category, video encoder 20 may calculate the distortion associated with each classifier (steps 308, 318, 328, and 338).

Video encoder 20 is also configured to determine the offsets, and rate-distortion cost associated with encoding the current LCU in BO mode. In various examples, video encoder 20 may determine the R-D cost associated with encoding the current LCU in BO mode in parallel with determining the costs associated with each of the EO classifiers.

To determine the BO mode, video encoder 20 first classifies the samples of the current LCU into 32 bands (340). Video encoder 20 may classify the samples of the current LCU into 32 bands using an arithmetic right-shift in some examples. Responsive to classifying the samples of the current LCU into the 32 bands, video encoder 20 finds and stores the histogram peak for the current LCU (342). Responsive to finding the histogram peak, video encoder 20 may determine a sum of samples for each of the 4 band offset bands (344). The sum of samples (SOP) comprises a sum of differences between original and reconstructed samples of the current LCU. Responsive to calculating the SOP, video encoder 20 calculates a number of samples in each of the four BO bands (346). During calculation of the differences, the sum of differences, and the number of samples, video encoder 20 may clip the number of bits needed to represent each of the aforementioned quantities.

For each of the four bands, video encoder 20 uses the number of samples (NOP) as a divisor and divides the SOP in each band by the NOP in that band to determine the offset for that band (348). In accordance with the techniques of this disclosure, video encoder 20 may determine the offset for each band using an iterative division-by-subtraction method, as discussed above. Responsive to determining the four offsets, video encoder 20 may calculate the distortion for BO mode (350).

Once video encoder 20 has calculated the distortion for each of the EO classifiers, and for BO, video encoder 20 may compare and store the distortion statistics (352) for each of the modes and select one of the EO classifiers and the BO mode for the current LCU. In various examples, video encoder 20 may compare the stored statistics with the R-D costs determined for merge and skip modes, as described below with respect to FIG. 14.

Figure 14:
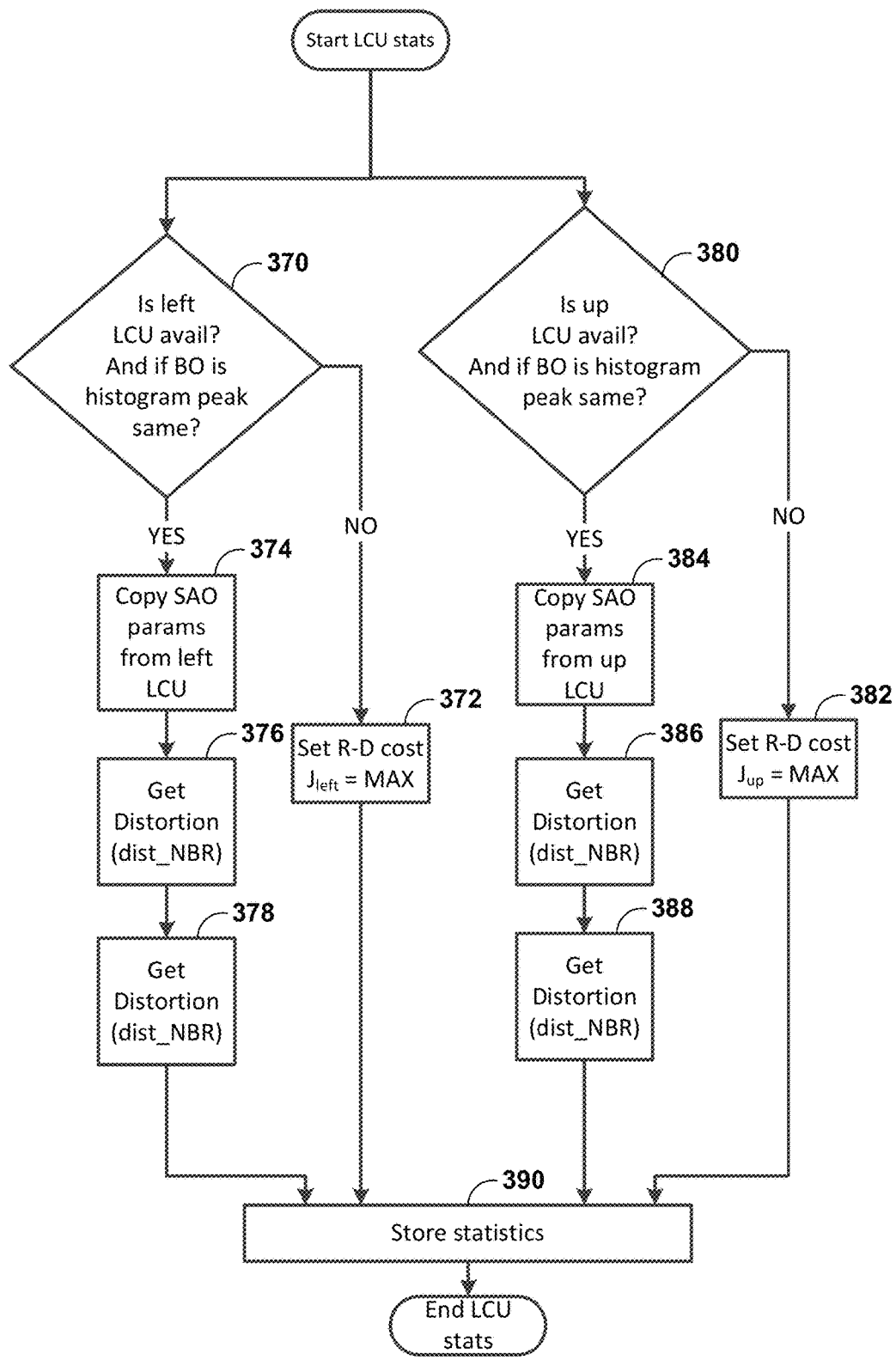
FIG. 14 is a flow diagram illustrating a process for performing SAO filtering in accordance with the techniques of this disclosure.

FIG. 14 is a flow diagram illustrating a process for performing SAO filtering in accordance with the techniques of this disclosure. In the method of FIG. 14, video encoder 20 may be configured to derive costs, offsets, distortions, and other values for merge left, mode and merge up mode. Video encoder 20 may be configured to perform the techniques illustrated with respect to FIG. 14 in parallel with the techniques illustrate in FIG. 13 in some examples.

Merge mode includes merge up, which copies SAO parameters from a top-neighboring LCU, and merge left, which copies SAO parameters from a left-neighboring LCU. The process of determining costs for merge-up and merge-left will now be discussed.

Video encoder 20 performs a similar process for merge left and merge up modes in that video encoder 20 attempts to determine the costs for both merge left and merge up modes if the modes (and corresponding LCUs) are available. If the costs for the two merge modes are equal, then video encoder 20 may select merge left mode, because merge left mode may require fewer bits to encode on average in some examples. In the following examples, the shorthand for "neighbor" (NBR) denotes either an up- or left-neighboring LCU relative to the current LCU based on the context in which it is used.

When attempting to determine costs for merge mode (i.e. merge left mode and merge up mode), video encoder 20 first tests whether the NBR LCU is available as a merge candidate (370, 380). If the current LCU is at a picture top or left boundary and the NBR LCU is outside the boundaries, the process returns true only if the NBR LCU is within the boundaries.

Next, video encoder 20 determines whether the NBR LCU belongs to a different slice or tile relative to the current LCU and whether the corresponding flags that enabled filtering across slice and tile boundaries may have been disabled. The process returns true if the cross-slice and tile access is enabled.

Video encoder 20 also determines whether the NBR LCU is using BO mode. If the NBR LCU was encoded using BO mode, video encoder 20 determines whether the BO histogram peaks for the neighboring LCU match the peaks of the current LCU (370, 380). If the BO peaks of the NBR do not match, then there is no way of estimating the distortion, D, and therefore merge mode cannot be used. If all the conditions described below are true then the process returns true, otherwise ("YES" branch of decision box 370, 380), the process returns false, and video encoder 20 does not select merge mode ("NO" branch of decision box 370, 380).

If the left-NBR LCU uses BO as the luma SAO mode (i.e. NBR_sao_type_idx_luma is equal to 1), then video encoder 20 checks to determine whether the histogram peak bo_hist_peak$_{luma}$ for the current LCU is the same as the histogram peak of the NBR LCU NBR_bo_hist_peak$_{luma}$. The process returns false if the histogram peak for the current LCU and the histogram position of the neighboring LCU are not equal. Otherwise, the process returns true (this includes the NBR using EO case).

For the chroma channel of the LCU, video encoder 20 similarly determines whether the SAO mode of the NBR LCU uses BO SAO mode the chroma channel SAO mode (i.e. if NBR_sao_type_idx_chroma is equal to 1). If the NBR LCU uses BO SAO mode, then video encoder 20 checks to determine whether the histogram peaks bo_hist_peak$_{Cb}$ and bo_hist_peak$_{Cr}$ of the current LCU are the same as the histogram peaks of the NBR LCU NBR_bo_hist_peak$_{Cb}$ and NBR_bo_hist_peak$_{Cr}$, respectively (370). The process returns false if either one of the corresponding peaks are not equal to the peak of the current LCU. Otherwise the process return true (this includes the case where the NBR LCU is encoded using EO SAO). If at any point any of the above conditions are not true, video encoder 20 terminates the merge mode consideration process for that particular NBR LCU ("NO" branch of decision box 370, 380).

If the merge determination process returns false for chroma and/or luma (again, "NO" branch of decision boxes 370, 380), video encoder 20 sets the cost of the respective up or left merge mode J$_{merge\_Left}$ and J$_{merge\_Up}$ respectively, to the maximum possible cost value (372, 382). Setting the respective merge cost to the maximum cost disqualifies that merge mode from being selected by video encoder 20 if any of the above conditions are not true.

If the left- or top-NBR LCU is available and the above conditions are met, video encoder 20 copies the SAO parameters from the respective left- or top-NBR LCU (374, 384), and then calculates a rate-distortion cost for the respective merge mode (376, 386). Video encoder 20 computes the distortion of using the respective merge mode (dist_NBR) as below (378, 388). In particular, video encoder 20 calculates dist_NBR=Σ$_c$dist_NBR$_c$ where:

dist_NBR$_c$=Σ$_k$(NOP_X[c][k]×Offset_NBR[c][k]×Offset_NBR[c][k]−SOP_X[c][k]×Offset_NBR[c][k]×2), where X is the type of SAO (NBR_sao_type_idx_luma or NBR_sao_type_idx_chroma) used in the NBR LCU component c. The distortion calculation is described in the appendix of Chih-Ming Fu et al., "Sample Adaptive Offset in the HEVC Standard," IEEE Transactions on Circuits and Systems for Video Technology, Vol. 22, No. 12, December 2012. Even though video encoder 20 determines SOP and NOP based on samples from the current LCU, video encoder 20 derives the offsets for the current LCU from the offsets of the neighboring LCU when using merge mode.

Next, video encoder 20 computes the bincount for the current NBR as described below. Finally, video encoder 20 calculates the LCU rate-distortion cost for SAO merge mode encoding of the NBR LCU as J$_{merge\_NBR}$=dist_NBR+λ×(sao_merge_NBR_bias+bincount_NBR). In some examples, sao_merge_NBR_bias is equal to either the sao_merge_up_bias bias or the sao_merge_left_bias bias, both of which may have arbitrary values or be set to 0.

To perform merge mode SAO filtering, the current LCU requires access to SOP_E$_i$[c][edgeIdx] and NOP_E$_i$[c][edgeIdx] for all edge offset classes and components for the current LCU. Additionally, the parameters bo_hist_peak$_{luma}$, bo_hist_peak$_{Cb}$, and bo_hist_peak$_{Cr}$ for the current LCU are also required, as well as availability information for neighboring LCUs. Video encoder 20 also requires access to band offset SOP_B[c][bandIdx] and NOP_B[c][bandIdx] again for all components. For merge left consideration, video encoder 20 requires the following SAO parameters from the left NBR LCU (if the left NBR LCU is available): left_sao_type_idx_luma/chroma, left_offsets$_{luma}$, left_offsets$_{Cb}$, and left_offsets$_{Cr}$ as well as left_bo_hist_peak$_{luma}$, left_bo_hist_peak$_{Cb}$, and left_bo_hist_peak$_{Cr}$. For merge up consideration, video encoder 20 requires the following SAO parameters from the top NBR LCU are required (again, assuming the top NBR LCU is available): up_sao_type_idx_luma/chroma, up_offsets$_{luma}$, up_offsets$_{Cb}$, and up_offsets$_{Cr}$ as well as up_bo_hist_peak$_{luma}$, up_bo_hist_peak$_{Cb}$, and up_bo_hist_peak$_{Cr}$. The sole output of the merge mode cost estimation process is the rate-distortion cost, J$_{merge\_NBR}$, which video encoder 20 stores in step 390.

In some examples, video encoder 20 may attempt to determine whether it is more efficient use skip mode SAO for the current LCU or LCU component (sao_skip_flag). When video encoder 20 performs skip mode consideration for the luma component, video encoder 20 must first determine the EO and BO SAO mode parameters and associated rate-distortion costs so that video encoder 20 may compare the EO and BO costs to the skip cost. In one example, video encoder 20 may perform the comparison of the skip mode rate-distortion for chroma separately from comparing the luma skip mode cost comparison. Therefore, if video encoder 20 determines that skip mode should be selected and encoded for the current LCU, video encoder 20 only sets the SAO skip mode flags for the current LCU once the SAO EO and BO decision determination has been completed for both luma and chroma.

In another example, if video encoder 20 selected luma SAO skip mode, (i.e. set sao_type_idx_luma=0 because skip mode had the lowest rate-distortion cost after evaluating EO, BO, and skip mode), then video encoder 20 may skip the process of determining the best chroma SAO mode. In this example, video encoder 20 skips performing the costly chroma EO and BO derivation, terminates SAO LCU decision and sets both of the skip flags to 1. If, however, video encoder 20 enables luma SAO (i.e., selects either BO or EO for the current LCU), then video encoder 20 does not skip chroma SAO, and does not to need to perform chroma EO and BO derivation. In that case video encoder 20 sets skip flags only at the end of the decision algorithm.

In a different example, if the current LCU is IPCM-coded then video encoder 20 may skip determining the SAO mode for both luma and chroma channels. Video encoder 20 may also do the same (i.e. skip determining the luma and chroma SAO modes) if the majority of the samples in the LCU use lossless coding (e.g., the cu_transquant_bypass_flag is set for most of the CUs in the LCU). In some examples, video encoder 20 may vary the decision threshold (what percentage of the area of the LCU needs to satisfy above criteria) in order to use skip mode for the current LCU.

If video encoder 20 considers using no SAO processing (i.e. skip mode) during luma or chroma derivation, video encoder 20 calculates a rate-distortion cost (sao_type_idx_luma/chroma equal to 0). The distortion component is equal to 0 since D represents distortion reduction for SAO, and for this case D is equal to 0. The rate cost is equivalent to the bin cost of sao_type_idx_luma or sao_type_idx_chroma set to 0 (1 bin). The resulting cost yields $J_{no\_SAO,luma}=\lambda \times (1+\text{sao\_off\_luma\_bias})$ for the luma component and $J_{no\_SAO,chroma}=\lambda \times (1+\text{sao\_off\_chroma\_bias})$ for the chroma component. The sao_off_luma_bias and sao_off_chroma_bias biases may be arbitrary values or fixed to zero in some examples.

Video encoder 20 performs an estimation of a bit count necessary to encode various SAO modes. In one example, the estimation of bits used to code the SAO syntax during the calculation of the rate-distortion (R-D) is done by counting the number of CABAC bins for the SAO syntax elements (a "bin count"). Note here that other optional implementations where high-complexity calculations are possible, video encoder 20 may perform full CABAC encoding of the syntax and this may yield more accurate rate costs for the R-D cost derivation. In some examples described below, this disclosure includes a description of a low-complexity approach.

To estimate the luma bit count, video encoder 20 calculates the bin count, $bincount_{EO,luma,sao\_eo\_class}$, as:

$$bincount_{EO,luma,sao\_eo\_class} =$$
$$bincount(\text{sao\_type\_idx\_luma}) + bincount(\text{sao\_eo\_class\_luma}) +$$
$$\sum_{i \in (0,1,2,3)} bincount_{EO}(\text{sao\_offset}_{Y,sao\_eo\_class,i}) =$$

-continued $$4 + \sum_{i \in (0,1,2,3)} bincount_{EO}(\text{sao\_offset}_{Y,sao\_eo\_class,i})$$

To estimate the chroma bit count for both chroma components when video encoder 20 applies EO filtering, video encoder 20 calculates the bincount as:

$bincount1_{EO,chroma}=bincount(sao\_type\_idx\_chroma)+$
$\quad bincount0_{EO,chroma,sao\_eo\_class}=2+$
$\quad bincount0_{EO,chroma,sao\_eo\_class}$ To estimate the bincount for a specific luma class, video encoder 20 calculates the bin count as:

$$bincount0_{EO,chroma,sao\_eo\_class} = bincount(\text{sao\_eo\_class\_chroma}) +$$
$$\sum_{c \in (Cb,Cr)} \left( \sum_{i \in (0,1,2,3)} bincount_{EO}(\text{sao\_offset}_{c,i}) \right) =$$
$$2 + \sum_{c \in (Cb,Cr)} \left( \sum_{i \in (0,1,2,3)} bincount_{EO}(\text{sao\_offset}_{c,i}) \right)$$

Based on c, taking the values of Y, Cb, and Cr, the bin count estimate for each chroma component when video encoder 20 performs BO mode is calculated as:

$$bincount0_{BO,c} =$$
$$bincount(\text{sao\_band\_position}_c) + \sum_{i \in (0,1,2,3)} bincount_{BO}(\text{sao\_offset}_{c,i}) =$$
$$5 + \sum_{i \in (0,1,2,3)} bincount_{BO}(\text{sao\_offset}_{c,i})$$

For the luma channel, video encoder 20 calculates the bit count estimate for BO mode as:

$bincount1_{BO,luma}=bincount(sao\_type\_idx\_luma)+$
$\quad bincount0_{BO,Y}=2+bincount0_{BO,Y}$ Video encoder 20 calculates the bin count estimate for both chroma components when BO is applied as:

$bincount1_{BO,chroma}=bincount(sao\_type\_idx\_chroma)+$
$\quad bincount0_{BO,Cb}+bincount0_{BO,Cr}$ Then, video encoder 20 calculates the hit estimate for the entire LCU as:

$$bincount_{SAO,LCU} = bincount(\text{sao\_merge\_left\_lag}) +$$
$$bincount(\text{sao\_merge\_up\_flag}) + bincount_{luma} + bincount_{chroma}$$

Based on the above calculations then, for the case of best_sao_type_idx_luma=2, $bincount_{luma}=bincount1_{EO,luma}$. For the case of best_sao_type_idx$_{luma}$=2, $bincount_{chroma}=bincount1_{EO,chroma}$. For the case of best_sao_type_idx_luma=1, $bincount_{luma}=bincount1_{BO,luma}$. For the case of best_sao_type_idx_chroma=1, $bincount_{chroma}=bincount1_{BO,chroma}$. For the case of best_sao_type_idx_luma=0, $bincount_{luma}$=bincount(sao_type_idx_luma)=bincount(0). And, for the case of best_sao_type_idx_chroma=0, $bincount_{chroma}$=bincount(sao_type_idx_chroma)=bincount(0).

Additionally, video encoder 20 sets the bin count for the sao_merge_left/up_flag equal to zero if they are not set. Otherwise, video encoder 20 sets the bin count for the merge flags equal to one. Video encoder 20 calculates the bin count for sao_type_idx. Video encoder 20 calculates the bin count as bincount(a)=max(2, a+1). The bin counts are illustrated in Table 5, below:

TABLE 5

Bin counts for SAO Type Indices

| SAO_TYPE | Meaning | # of bins |
|---|---|---|
| 0 | SAO off | 1 |
| 10 | BO | 2 |
| 11 | EO | 2 |

Video encoder 20 also determines the values for sao_eo_class syntax element. The bin count for the sao_eo_class syntax element is equal to two. Video encoder 20 may be further configured to determine that the bin count for the sao_bands_position syntax element is equal to five.

For EO mode, video encoder 20 calculates the bin count for the signaled offsets as $bincount_{EO}(a)=max(7, abs(a)+1)$, which is illustrated in Table 6, below.

TABLE 6

| EO | 1 | 2 | 3 | 4 | 5 | 6 | 7 |
|---|---|---|---|---|---|---|---|
| Bin # | 1 | 2 | 3 | 4 | 5 | 6 | 7 |

For BO mode, the bin count for zero offset is 1, while for a non-zero offsets b, the bincount is $bincount_{BO(b)}=1+max(7, abs(ab)+1)$. This is illustrated in table 7, below.

TABLE 7

Bin Counts for SAO BO offsets

| BO | −7 | −6 | −5 | ... | −2 | −1 | 0 | 1 | 2 | ... | 5 | 6 | 7 |
|---|---|---|---|---|---|---|---|---|---|---|---|---|---|
| Bin # | 8 | 8 | 7 | | 4 | 3 | 1 | 3 | 4 | | 7 | 8 | 8 |

Figure 15:
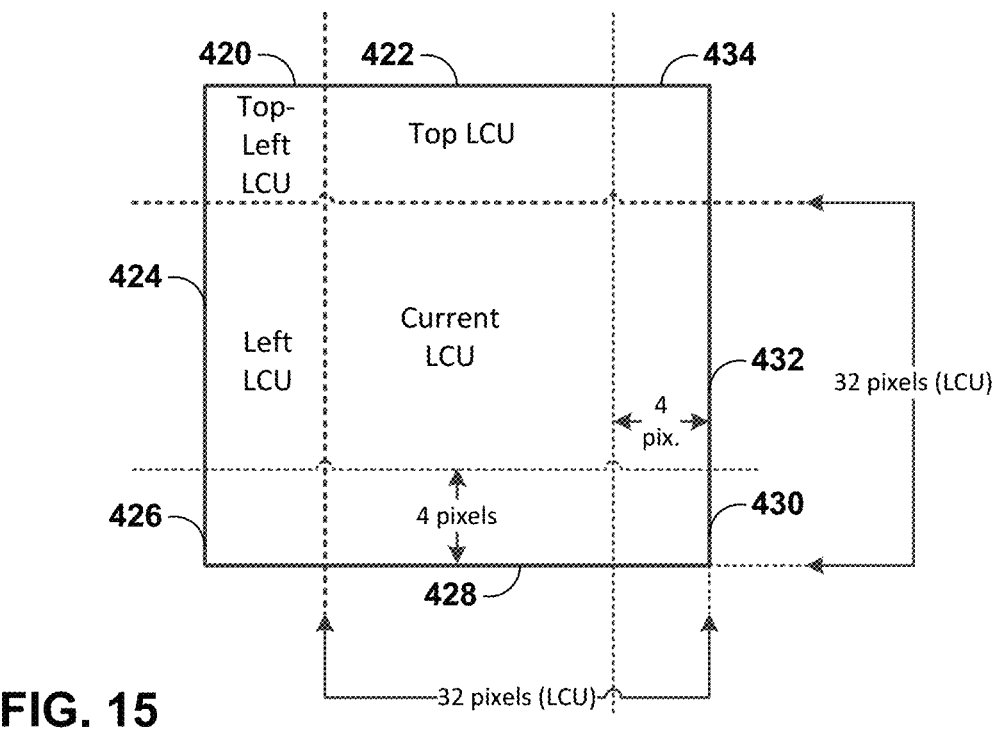
FIG. 15 is a conceptual diagram illustrating a current LCU, and neighboring LCUs.

FIG. 15 is a conceptual diagram illustrating a current LCU, and neighboring LCUs. In the diagram of FIG. 15, the current LCU is bordered by a top-left LCU 420, a top LCU 422, a left LCU 424, a bottom-left LCU 426, a bottom LCU 428, a bottom-right LCU 430, a right LCU 432, and a top-right LCU 434. The top-left, top, and left LCUs are most likely available to the current LCU. However, the other neighboring LCUs, i.e. the bottom-right LCU 430, bottom-left LCU 426, bottom LCU 428, right LCU 432, and top-right LCU 434, may be unavailable to the current LCU, because video encoder 20 may not have processed these neighboring LCUs yet. However, video encoder 20 may need access to samples of these neighboring LCUs, for example to perform edge offset mode derivation, as the neighboring pixels used to determine the EO classifier of the current pixel, are required to perform EO derivation.

Video encoder 20 stores the samples for use when performing deblocking in two processing buffers, referred to as "preSao," and "postSao." In some examples, the buffers may be allocated in memory 64 (FIG. 4). In one possible implementation, the main processing buffers, preSao and postSao, store samples prior to, and after the application of SAO processing. The size of the preSao buffer may be (LCU_SIZE+db_skip_cols+1)×(LCU_SIZE+db_skip_rows), in terms of width times height, respectively. In one example, video encoder 20 may set the value of LCU_SIZE to 32 for luma and LCU_SIZE and 16 for chroma. The terms db_skip, rows and db_skip_cols denote rows of pixels to the bottom of the current LCU and columns of pixels to the right of the current LCU that the DB block is not processing, for an LCU that does not lie at either the right or bottom boundary of the picture. In one implementation, video encoder 20 may set the number of rows and columns on which to skip deblocking to 4.

Figure 16:
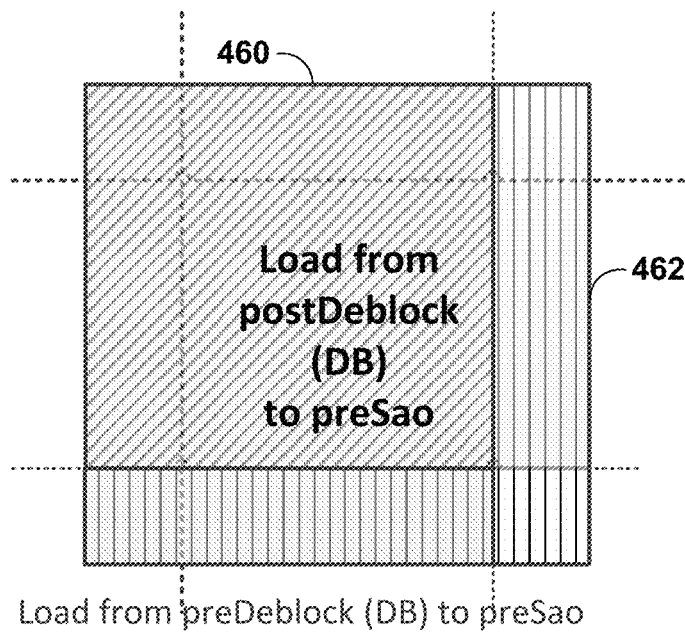
FIG. 16 is a conceptual diagram illustrating a technique for buffering samples from LCUs relative to a current LCU in accordance with the techniques of this disclosure.

FIG. 16 is a conceptual diagram illustrating a technique for buffering samples from LCUs relative to a current LCU in accordance with the techniques of this disclosure. FIG. 16 illustrates the pixels (samples) that video encoder 20 stores in the preSAO buffer described above with respect to FIG. 15. FIG. 16 illustrates two regions, a first region 460 containing the current LCU, the top-neighboring LCU, the left-neighboring LCU, and the top-left LCU relative to the current LCU, and a second region 462 containing the top-right-neighboring LCU, the right-neighboring LCU, the bottom-right-neighboring LCU, the bottom-neighboring LCU, and the bottom-left-neighboring LCU. Video encoder 20 may have already deblocked the samples in the first region (the preSAO region), and video encoder 20 may store the deblocked samples of first region 460 in a buffer. Video encoder 20 may not have already deblocked the sample of second region 462, but may store the samples of second region 462 in the same buffer as the samples of first region 460.

Figure 17:
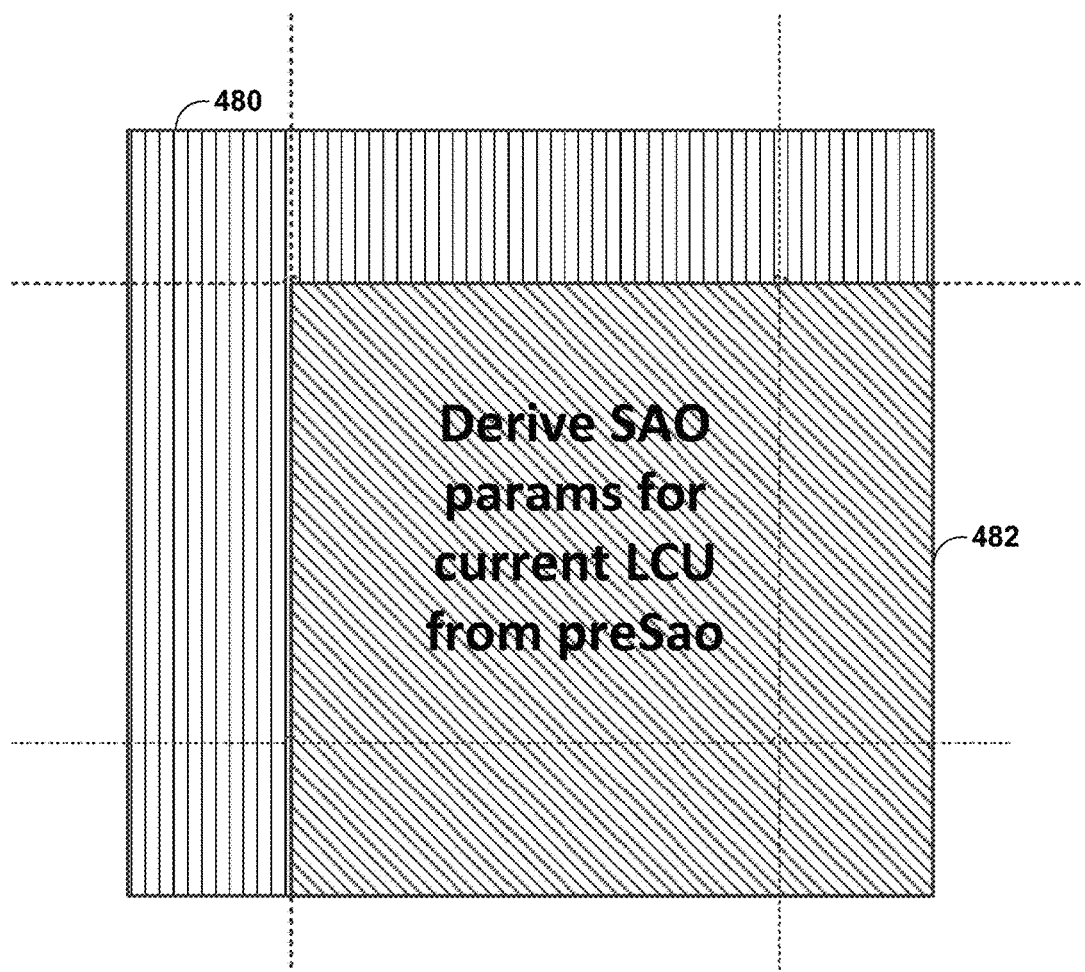
FIG. 17 is a conceptual diagram illustrating a region of samples that a video encoder uses to derive sample adaptive offset parameters in accordance with the techniques of this disclosure.

FIG. 17 is a conceptual diagram illustrating a region of samples that a video encoder uses to derive sample adaptive offset parameters in accordance with the techniques of this disclosure. FIG. 17 illustrates a first region 480 (illustrated with vertical hashing) that video encoder 20 uses samples from, as illustrated in FIGS. 15-16, but which video encoder 20 may use to derive SAO parameters. First region 480 includes the top-left-neighboring LCU, the top-neighboring LCU, the left-neighboring-LCU, and the bottom-left-neighboring LCU. FIG. 17 also illustrates a second region 482 (illustrated with diagonal hashing), which video encoder 20 may store in the same buffer as the first region, and which video encoder 20 may use to derive SAO parameters for the current LCU. Second region 482 may include the current LCU, right-neighboring LCU, bottom-neighboring LCU, and bottom-right-neighboring LCU.

Figure 18:
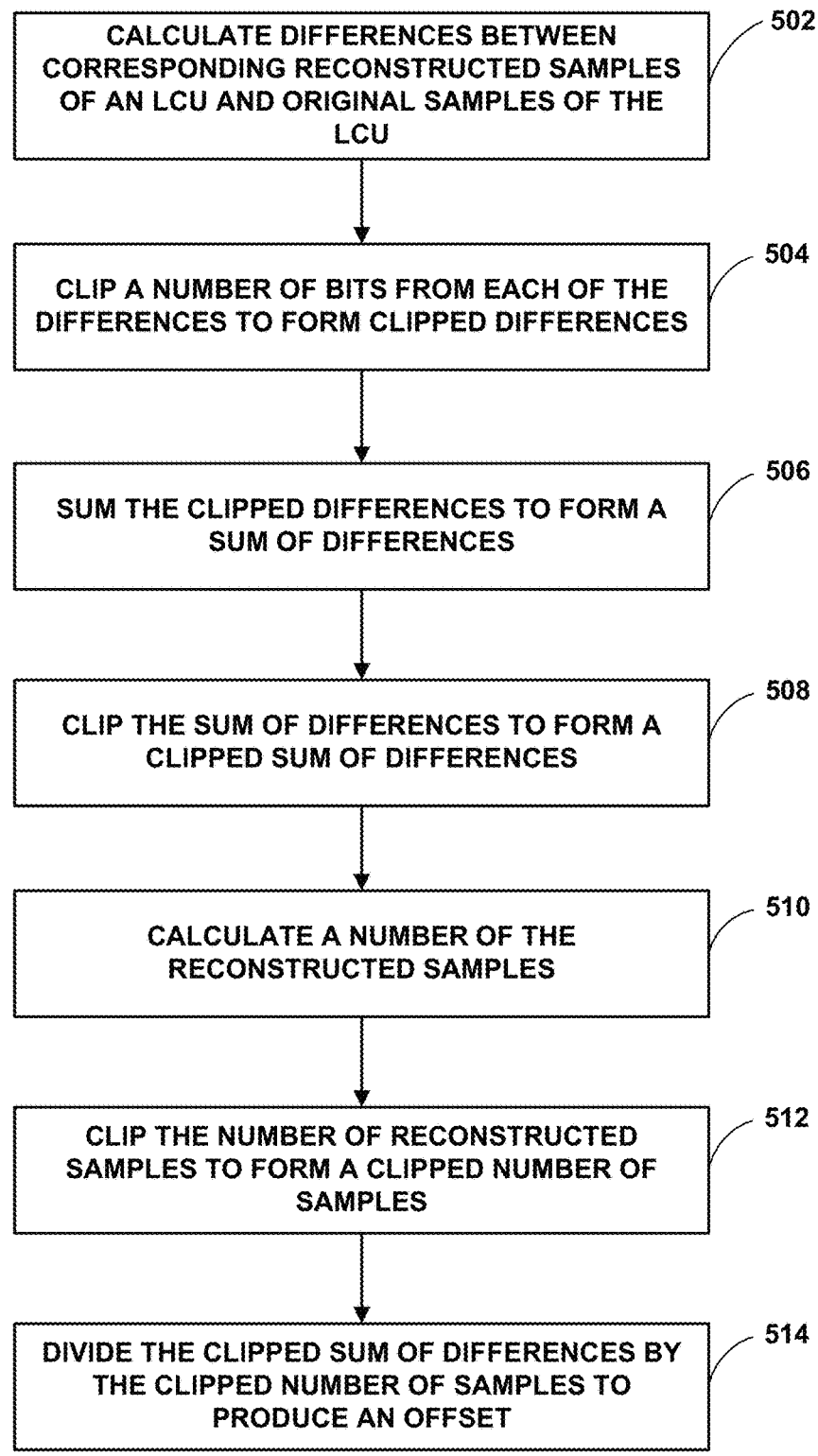
FIG. 18 is a flow diagram illustrating a process for determining an SAO mode for a largest coding unit in accordance with the techniques of this disclosure.

FIG. 18 is a flow diagram illustrating a process for determining an SAO mode for a largest coding unit in accordance with the techniques of this disclosure. For the purpose of example only, it should be understood that a video encoder, such as video encoder 20 may perform the process illustrated in FIG. 18. In the example of FIG. 18, video encoder 20 may be configured to encode samples of the LCU of a picture using a sample adaptive offset SAO mode. To encode the sample of the LCU, SAO unit 74 of video encoder 20 may be configured to calculate differences between corresponding reconstructed samples of the LCU and original samples of the LCU (502). SAO unit 74 may be further configured to clip a number of bits from each of the differences to form clipped differences (504), and sum the differences to form a sum of differences (506), SAO unit 74 may be further configured to dip the sum of differences to form a clipped sum of differences (508).

Responsive to calculating the clipped sum of differences, SAO unit 74 may be further configured to calculate a number of the reconstructed samples (510), and clip a number of bits from the number of reconstructed samples to form a clipped number of samples (512), and divide the clipped sum of differences by the clipped number of samples to produce an offset for the LCU (514).

In some examples, the SAO mode may comprise a band offset mode or an edge offset mode. In other examples, the SAO may comprise a band offset mode, and video encoder 20 may be further configured to determine the band offset for the band offset mode. To determine the band offset mode, video encoder 20 may be further configured to iteratively arithmetically right-shift the original samples of the LCU to classify the original samples into a bin of a 32-bin histogram.

In various examples, the original samples may comprise original samples of a component plane (e.g., a luma component plane or a chroma component plane) of the LCU. Additionally, in these examples, the reconstructed samples may comprise reconstructed samples of the component plane of the LCU. In these examples, video encoder 20 may be further configured to terminate the iteration classification of the samples when a number of samples belonging to one of the 32 bins of the histogram is greater than or equal to half a number of samples belonging to a current component plane of the LCU.

In yet some other examples, to divide the clipped sum of differences to produce the offset for the LCU, video encoder 20 may iteratively subtract the number of pixels from a variable equal to the sum of differences until the variable is less than or equal to zero, determine the offset for the LCU as the number of iterative subtractions performed, and determine a sign of the offset based on a sign of the sum of differences.

In another example, video encoder 20 may be further configured to store post-deblocked samples of top- and left-neighboring LCUs relative to the LCU (e.g., in a buffer), store pre-deblocked samples of bottom- and right-neighboring LCUs relative to the current LCU, and store samples of the LCU. To encode the samples of the LCU using the SAO mode, video encoder 20 may be further configured to encode the samples of the LCU based on at least some of the samples of the LCUs. In yet another example, video encoder 20 may be configured to determine the SAO mode for the LCU based on the samples of the LCU and the samples of the pre-deblocked samples of the bottom- and right-neighboring LCUs stored in the buffer.

Figure 19:
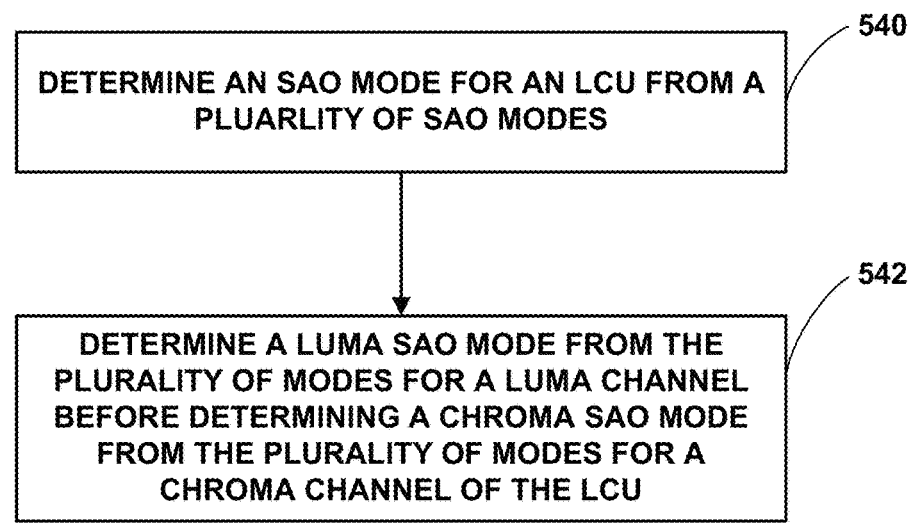
FIG. 19 is a flow diagram illustrating a process for determining an SAO mode for a largest coding unit in accordance with the techniques of this disclosure.

FIG. 19 is a flow diagram illustrating a process for determining an SAO mode for a LARGEST coding unit in accordance with the techniques of this disclosure. For the purpose of example only, it should be understood that a video encoder, such as video encoder 20 may perform the process illustrated in FIG. 19. In the example of FIG. 19, video encoder 20 may be configured to determine an SAO mode for an LCU from a plurality of SAO modes (540). The plurality of SAO modes may comprise: a band offset mode, an edge offset mode, a merge up mode, a merge left, mode, and a skip mode. To determine the SAO mode, video encoder 20 may determine the at least one SAO mode based on a predetermined priority of SAO modes for the LCU. In some examples, to determine the at least one SAO mode, video encoder 20 may determine a luma SAO mode from the plurality of modes for a luma channel of the LCU before determining a chroma SAO mode from the plurality of modes for a chroma channel of the LCU (542).

In some examples, video encoder 20 may further determine whether one of the merge left mode, the merge up mode, and the skip mode has a rate-distortion cost that is less than or equal to the threshold cost. Responsive to determining that one of the merge left mode, the merge up mode, and the skip mode has a rate-distortion cost that is less than or equal to the threshold cost video encoder 20 may select one of the merge left mode, the merge up mode, and the skip mode that has the rate-distortion cost that is less than or equal to the threshold cost. In another example, video encoder 20 may determine whether one of the merge left mode, merge up mode, and the skip mode has a rate-distortion cost that is greater than a threshold cost. Responsive to determining that the one of the merge left mode, the merge up mode, and the skip mode has a rate-distortion cost that is greater than the threshold cost, video encoder 20 may select the edge offset mode or the band offset mode for the LCU.

In various examples, to determine the SAO mode for the LCU from one of the plurality of SAO modes, video encoder 20 may be further configured to determine an SAO mode from a plurality of modes for a luma channel of the LCU before determining an SAO mode from the plurality of modes for a chroma channel the LCU.

In some other examples, to determine the at least one SAO mode based on the predetermined priority of SAO modes, video encoder 20 may be further configured to: determine whether a first SAO mode of the plurality of SAO modes and second one of the plurality of SAO modes have a same rate-distortion cost. Responsive to determining that the first SAO mode and the second SAO mode have the same rate-distortion cost, video encoder 20 may select the first SAO mode for the LCU. In some examples, the first mode may comprise a band offset mode and the second mode may comprise an edge offset mode. In another example, the first mode may comprise the merge left mode, and the second mode may comprise the merge up mode. In another example, the first mode may comprise the band offset mode or the edge offset mode and the second mode may comprise the merge up mode or the merge left mode. In yet another example, the first mode may comprise the skip mode, and the second mode may comprise the band offset mode or the edge offset mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   encoding, by a video encoder, samples of a largest coding unit (LCU) of a picture using a sample adaptive offset (SAO) mode, wherein encoding the samples of the LCU using the SAO mode comprises:
      calculating, by the video encoder, differences between corresponding reconstructed samples of the LCU and original samples of the LCU;
      clipping, by the video encoder, a number of bits from each of the differences to form clipped differences which have a first specified number of bits and fall within a respective first range of values;
      summing, by the video encoder, the clipped differences to form a sum of differences;
      clipping, by the video encoder, a number of bits from the sum of differences to form a clipped sum of differences which has a second specified number of bits and falls within a respective second range of values;
      calculating, by the video encoder, a number of the reconstructed samples;
      clipping, by the video encoder, a number of bits from the number of reconstructed samples to form a clipped number of samples which has a third specified number of bits and falls within a respective third range of values; and
      dividing, by the video encoder, the clipped sum of differences by the clipped number of samples to produce an offset for the LCU, wherein dividing the clipped sum of differences to produce the offset for the LCU comprises:
         iteratively subtracting, by the video encoder, the number of samples from a variable equal to the sum of differences so long as the variable is greater than zero and the number of iterative subtractions performed is less than 8;
         determining, by the video encoder, the offset for the LCU as the number of iterative subtractions performed; and
         determining, by the video encoder, a sign of the offset based on a sign of the sum of differences.

2. The method of claim 1, wherein the SAO mode comprises a band offset mode or an edge offset mode.

3. The method of claim 1, wherein the SAO mode comprises a band offset mode and the offset for the LCU comprises a band offset, the method further comprising:
   determining the band offset for the band offset mode, wherein determining the band offset comprises iteratively arithmetically right shifting the original samples of the LCU to classify the original samples into a bin of a 32-bin histogram.

4. The method of claim 3, wherein the original samples comprise original samples of a component plane of the LCU, and the reconstructed samples comprise reconstructed samples of the component plane of the LCU, the method further comprising:
   terminating the iterative classification when a number of samples belonging to one of the 32 bins of the histogram is greater than or equal to half a number of samples belonging to a current component plane of the LCU.

5. The method of claim 1, the method further comprising:
   storing post-deblocked samples of top- and left-neighboring LCUs relative to the LCU;
   storing pre-deblocked samples of bottom- and right-neighboring LCUs relative to the current LCU;
   storing samples of the LCU; and
   wherein encoding the samples of the LCU using the SAO mode comprises encoding the samples of the LCU using the SAO mode based on at least some of the stored samples of the LCUs.

6. A device for encoding video data, the device comprising:
   a memory; and
   at least one processor, wherein the at least one processor is configured to:
      encode samples of a largest coding unit (LCU) of a picture using a sample adaptive offset (SAO) mode, wherein to encode the samples of the LCU using the SAO mode, the at least one processor is configured to:
         calculate differences between corresponding reconstructed samples of the LCU and original samples of the LCU;
         clip a number of bits from each of the differences to form clipped differences which have a first specified number of bits and fall within a respective first range of values;
         sum the clipped differences to form a sum of differences;

clip a number of bits from the sum of differences to form a clipped sum of differences which has a second specified number of bits and falls within a respective second range of values;

calculate a number of the reconstructed samples;

clip a number of bits from the number of reconstructed samples to form a clipped number of samples which has a third specified number of bits and falls within a respective third range of values; and divide the clipped sum of differences by the clipped number of samples to produce an offset for the LCU, wherein to divide the clipped sum of differences to produce the offset for the LCU, the at least one processor is further configured to:

iteratively subtract the number of samples from a variable equal to the sum of differences so long as the variable is greater than zero and the number of iterative subtractions performed is less than 8;

determine the offset for the LCU as the number of iterative subtractions performed; and determine a sign of the offset based on a sign of the sum of differences.

7. The device of claim 6, wherein the SAO mode comprises a band offset mode or an edge offset mode.

8. The device of claim 6, wherein the SAO mode comprises a band offset mode and the offset for the LCU comprises a band offset, and wherein the at least one processor is further configured to:

determine the band offset for the band offset mode, wherein to determine the band offset, the at least one processor is further configured to iteratively arithmetically right shift the original samples of the LCU to classify the original samples into a bin of a 32-bin histogram.

9. The device of claim 8, wherein the original samples comprise original samples of a component plane of the LCU, and the reconstructed samples comprise reconstructed samples of the component plane of the LCU, wherein the at least one processor is further configured to:

terminate the iterative classification when a number of samples belonging to one of the 32 bins of the histogram is greater than or equal to half a number of samples belonging to a current component plane of the LCU.

10. The device of claim 6, wherein the at least one processor is further configured to:

store post-deblocked samples of top- and left-neighboring LCUs relative to the LCU;

store pre-deblocked samples of bottom- and right-neighboring LCUs relative to the current LCU;

store samples of the LCU; and wherein to encode the samples of the LCU using the SAO mode, the at least one processor is configured to encode the samples of the LCU based on at least some of the stored samples of the LCUs.

* * * * *